(12) United States Patent
Rakib et al.

(10) Patent No.: US 8,875,212 B2
(45) Date of Patent: Oct. 28, 2014

(54) SYSTEMS AND METHODS FOR REMOTE CONTROL OF INTERACTIVE VIDEO

(76) Inventors: Shlomo Selim Rakib, Cupertino, CA (US); Alexander Bronstein, San Jose, CA (US); Michael Bronstein, Santa Clara, CA (US); Gilles Bruno Marie Devictor, Milpitas, CA (US)

( * ) Notice: Subject to any disclaimer, the term of this patent is extended or adjusted under 35 U.S.C. 154(b) by 1059 days.

(21) Appl. No.: 12/423,752

(22) Filed: Apr. 14, 2009

(65) Prior Publication Data
US 2009/0327894 A1   Dec. 31, 2009

Related U.S. Application Data

(60) Provisional application No. 61/045,254, filed on Apr. 15, 2008.

(51) Int. Cl.
| | |
|---|---|
| H04N 7/10 | (2006.01) |
| H04N 7/025 | (2006.01) |
| H04N 7/173 | (2011.01) |
| H04N 7/16 | (2011.01) |
| H04N 21/2343 | (2011.01) |
| G11B 27/34 | (2006.01) |
| H04N 21/41 | (2011.01) |
| H04N 21/43 | (2011.01) |
| H04N 21/4725 | (2011.01) |
| H04N 21/84 | (2011.01) |

(52) U.S. Cl.
CPC ........ *H04N 21/234318* (2013.01); *G11B 27/34* (2013.01); *H04N 21/4126* (2013.01); *H04N 21/4307* (2013.01); *H04N 21/4725* (2013.01); *H04N 21/84* (2013.01)
USPC .............. 725/133; 725/136; 725/32; 725/141

(58) Field of Classification Search
None
See application file for complete search history.

(56) References Cited

U.S. PATENT DOCUMENTS

| | | | |
|---|---|---|---|
| 7,120,924 B1 * | 10/2006 | Katcher et al. | 725/60 |
| 2003/0088879 A1 * | 5/2003 | Martinez et al. | 725/110 |
| 2005/0108751 A1 * | 5/2005 | Dacosta | 725/39 |
| 2005/0229233 A1 * | 10/2005 | Zimmerman et al. | 725/135 |
| 2008/0263583 A1 * | 10/2008 | Heath | 725/32 |

* cited by examiner

*Primary Examiner* — Mark D Featherstone
(74) *Attorney, Agent, or Firm* — Stephen E. Zweig

(57) ABSTRACT

The present invention describes a system and method for controlling interactive video, including a remote control device allowing the user to interact with the video. The method allows bringing the "lean-forward" hypervideo experience to a "lay-back" environment such as the TV screen. The method also allows for the creation of a single system that combines both the social aspects of the "lay-back" and the "lean-forward experience" into a new type of rich media viewing experience.

20 Claims, 14 Drawing Sheets

SYSTEMS AND METHODS FOR REMOTE CONTROL OF INTERACTIVE VIDEO

RELATED APPLICATIONS

This application claims the priority benefit of U.S. Provisional Patent Application No. 61/045,254, filed Apr. 15, 2008, the disclosure of which is incorporated by reference herein.

BACKGROUND

As computer and video technology has advanced, there has been an increasing interest in bringing the convenience of hypertext-like linking and annotation to video and multimedia applications. Users, now accustomed to the ability of instantly clicking on links in internet web pages, now increasingly want to have a similar ability of instantly finding out more about the objects that are displayed in video content. Such a type of rich video content where objects serve as anchors associated with some actions is often referred to as "hypervideo", by analogy to hypertext.

As a result, a number of multimedia methods have developed that attempt to link hypertext and other information (metadata) to video images. Metadata is a generic term referring here to semantic information describing the video content. Such information can be description of the entire video sequence, temporal portions of it or spatio-temporal objects.

The creation of metadata associated with video objects is often referred to as "annotation". This can be an automatic, semi-automatic or manual process. Typically, the user indicates an object (often an image of a real-world object such as a person, place, or thing). This can be done, for example, by defining the object's boundaries by a manual process, or by pointing to a pre-segmented object in a semi-automatic process. The user then creates a metadata entry associated with this indicated or pointed to object.

Typically, the metadata includes at least two data structures, either linked or separate from each other. The first structure is the representation of video objects, and the second structure is their annotation. Representation of video objects can be done in different manners, including, for example, bounding boxes, collections of primitive geometric figures (constructive geometry), octrees and binary space partition trees, volume maps, etc. Such a representation allows the user to determine a spatio-temporal coordinate in the video (e.g., the spatial and temporal "location" in the video where another user might later use to select the video object by clicking a mouse or other pointing device), and select a video object located at this location. Having identified the video object, its corresponding annotation can then be retrieved from an annotation database.

Annotation, in turn, is a wide term referring to some description of video objects. Such a description may contain textual information, multimedia description, or description of actions associated with an object and performed when this object is clicked.

As an example of an industrial standard for metadata description, the MPEG-7 multimedia content description interface standard provides for an extensible markup language (XML) that for the representation of objects and their annotation. MPEG-7 information includes information pertaining to the actual title of the video content, copyright ownership, storage format, spatial and time information such as scene cuts, information about colors, textures and sound, information about the objects in a video scene, summaries, and content index information. Some of the MPEG-7 image feature descriptors include silhouettes of objects or outlines of objects.

Although MPEG-7 contains video metadata, and does not contain the actual video information, other emerging standards, such as MPEG-47, combine both compressed MPEG-4 video and the MPEG-7 multimedia content description interface into a single combined data storage format. Another example is the proprietary Adobe Flash technology, which combines both video and metadata.

One of the reasons for slow penetration of interactive video applications is due to the fact that the need to link metadata to the video content necessarily requires a different video distribution scheme. The video content must be packaged together in a special format (like one of the mentioned above), which implies changes on the content distributor side. The video client, on the other hand, is required to support such type of packaging.

As one of the consequences, in many cases legacy video content cannot be made interactive: if one has a collection of DVD movies, there is no way to incorporate metadata into the information stored on the DVD since it is a read-only medium.

Another factor explaining the slow penetration of interactive video is that traditionally, video viewing is considered a "lay-back" experience, where the user has no or very little interaction. That is, the user will "lay back" in his or her chair or couch, and will generally plan on watching the video with little or no interaction. Hypervideo experience, on the other hand, requires certain amount of interaction from the user, and thus can be considered a "lean-forward" experience. Here the user will generally be sitting by a computer or handheld device, and will be "leaning forward" in order to interact with the device—that is, use a mouse or other pointer to click various images and hyperlinks of image. A "lean forward" user expects to interact with the video, control the video, and obtain further information.

Thus, the main environment considered for hypervideo applications is a PC, which is "lean-forward" and naturally allows for video interaction using the PC pointing device (mouse). People using a PC as a TV replacement for watching video content are reported to perform additional tasks simultaneously or in addition with content watching: web surfing, searching information about actors or events in the movie, etc.

A big challenge tampering with a wide adoption of interactive video applications is porting the hypervideo experience to the TV "lay-back" environment. The multitasking nature of a PC environment is absent is a TV. A typical TV user has minimum interaction with the device, in the extreme case boiling down to starting the movie and watching it continuously without interruption.

Recently, it is reported that some users try to combine the lean-forward and lay-back experience, having a portable device while watching the TV. The TV is used to watch the content without interruption, and the portable device is used to access information according to interests arising during the content playback. Also, in many cases when the video content is watched by multiple persons, each of them has a separate mobile device and accesses different information independently and simultaneously.

There is also an important social aspect in the aforementioned environments. Typically, TV watching is a social experience, in which multiple persons (e.g. members of the same family) share the same experience. The PC environment has more of an individualistic character, where the user alone controls his experience.

Thus, there exists a need for improved systems, methods and devices that enhance a user's video experiences. As will be seen, the invention enables such systems, methods and devices in a novel and useful manner.

Previous efforts to improve the interactivity of television included various types of remote control devices and video on demand systems, such as the devices and systems taught in U.S. Pat. Nos. 6,678,740, 6,857,132, 6,889,385, and 6,970,127 by Rakib, U.S. Pat. No. 7,344,084 by DaCosta, and US patent applications 20020059637, 2002044225, and 20020031120 by Rakib.

DETAILED DESCRIPTION

Figure 1:
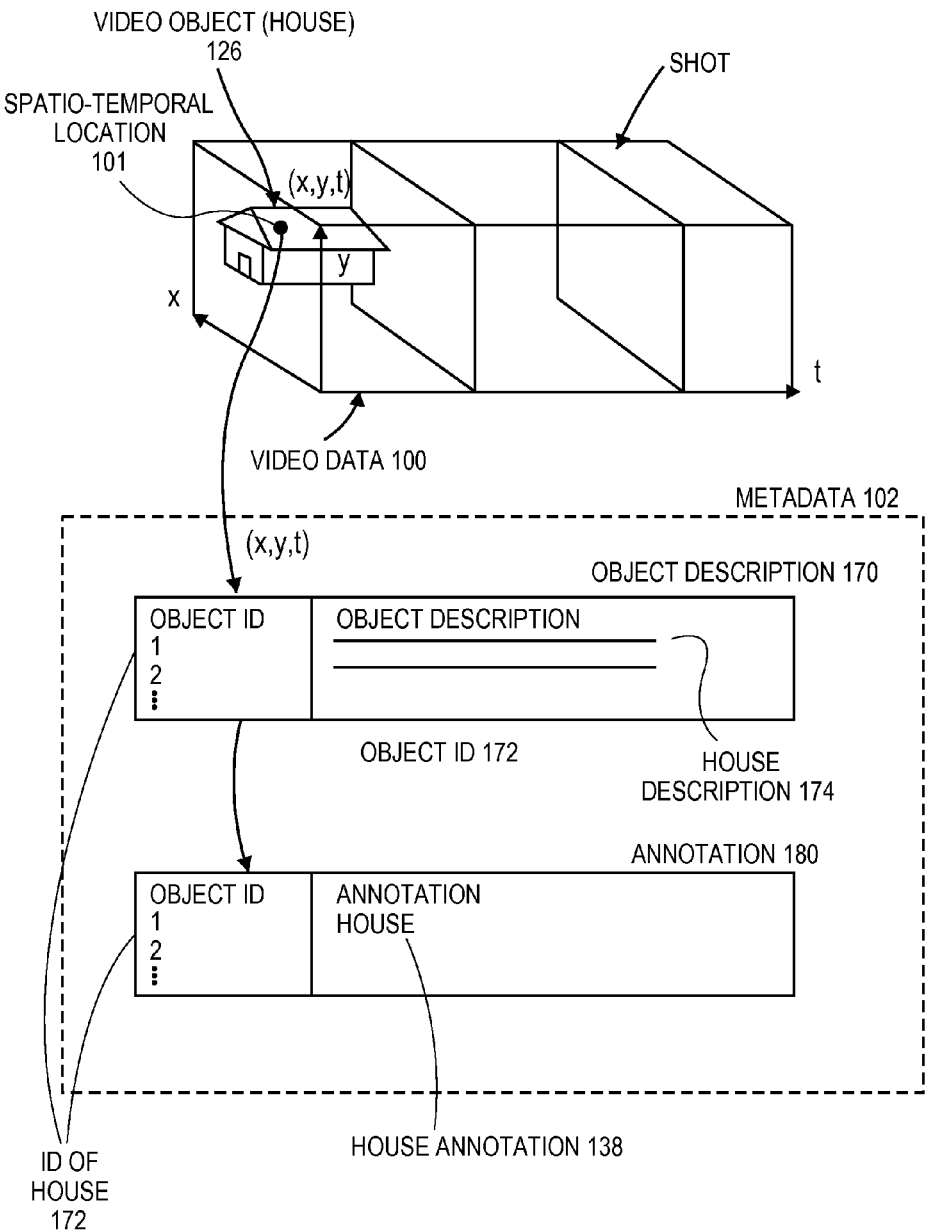
FIG. 1 shows an exemplary structure of video data and associated metadata.

In what follows, for the purposes of this discussion, and for purposes of clarity, the functionality of each component will be discussed separately, there is no requirement that each discussed component actually be present in a physically distinct enclosure. Thus the discussion of physically distinct enclosures is not intended to be limiting. Different combinations and permutations are possible. For example, in some embodiments it may be convenient to physically place two or more of the components into the same enclosure. In other embodiments, some of the functionality may be performed by remote devices, such as internet servers, residing elsewhere.

One drawback of legacy video content is that it is not interactive: if a user has a collection of DVD movies, there is no way to incorporate metadata into the information stored on the DVD since it is a read-only medium.

Attempts to address this problem use a client-server scheme for hypervideo, where the key feature of the scheme is that the video content and the metadata are separate. The client has the content and the server has the metadata. The link between the metadata and the video is created by computing "signatures" that uniquely describe objects in the video on the client side. The relevant metadata is retrieved by comparing these signatures to a database stored at the server. In the following, such a scheme of separating between metadata and the video data is referred to as "distributed metadata".

According to this scheme, only the video data is streamed from a content provider to a hypervideo client. Thus, the content provider is agnostic to hypervideo and may use legacy content which contains no metadata or any additional information. The video object is uniquely identified by its signature, generated by the hypervideo client during the video playback. Upon the user click on an object, a signature is sent to the metadata server. The metadata server uses the same process to independently pre-compute signatures for objects in the content mapped by the metadata server. The object is recognized by matching its signature to the signatures stored on the metadata server, and the associated metadata is sent to the hypervideo client.

In one aspect, the present invention can be viewed as an attempt to combine the lay-back and lean-forward environments for interactive video experience. In another aspect, the present invention attempts to bring hypervideo experience on the TV without interfering with the content displayed on the TV screen.

Additionally, the invention can be considered as a user interface. In one of the embodiments, the interface is performed using a remote control in the form of a small portable device with a screen and a pointing device. A touch-screen interface is used in one embodiment of the pointing device. During content playback, the TV screen and that of the remote can display the same content in a synchronized manner. The user can click an object on the remote, invoking actions associated with this object.

The actions here refer to some functionality or behavior occurring as a result of the user input and can include, for example, displaying textual, visual or other multimedia information. Such information can be displayed on the remote screen or on the TV screen, thus with or without interrupting the general viewing experience. Another example of action relates to editing the information associated with the object. In community-edited knowledge bases like the Wikipedia, every user can add or modify the content. An action associated with an object in video can be invoking an editor which allows the user to annotate new objects or change the annotation of existing object.

In another aspect, the present invention attempts to combine the individualistic and the social characteristics of the video watching experience. Since hypervideo is an interactive experience, there are many challenges related to situations in which the users have a disagreement related to the content control (for example, one member of a family may want to find out more about the purse that an actress is holding, while another family member may want to find out more about the car the actress is driving, and a third family member may just want to fast forward through the entire scene altogether). In one of the possible use cases of the present invention, multiple users can watch the same video content on a shared primary TV screen, while each of the users also has a personal remote device, on which he or she can retrieve and display supplemental metadata and content according to his or her preference without interfering with the shared TV screen. Each user may also exchange content from the remote device to the shared screen or between other remote devices.

In some embodiments of the invention, the TV screen and the remote device are connected either wired or wirelessly to a media router device. In one of the embodiments, the function of the media router device is to synchronize the video information displayed on the TV screen and the remote. In another embodiment, the hypervideo client is implemented on the media router device, and the remote is used as its interface. In this configuration, the media router receives the action from the remote, and in turn sends the associated metadata. In other embodiments, the hypervideo distribution scheme is based on video object signatures. The metadata is not streamed together with the video content, but is retrieved using the signature which describes the object. In one embodiment, the signature is computed on the remote device. In another embodiment, the signature is computed on the media router.

Additionally, the invention provides for a method to allow a local community to annotate video metadata, or alternatively in a more distributed manner to allow for peer-to-peer annotation of video metadata.

The hand-held remote control device will often interact with a local video and metadata server, such as a media router, and another main video screen, such as a video (television) monitor designed for communal viewing. The hand-held remote control device will have its own built-in display screen, which when not retrieving metadata will usually show images that are synchronized with the main video screen. However when additional metadata is available, the remote control device will signal the user, and the user will have the option of privately viewing or interacting with the metadata while the video program continues to play on the main video screen. The system allows users to quickly identify items of interest in a video, and use these items to control video playback, obtain additional information, or engage in an online purchase of the item.

Video Source: A video source in its most abstract form, is any device, system, or means capable of storage and distribution of video data (and audio data associated with the video data). Since the vast majority of video information contains sound as well as images, unless otherwise indicated, the in this specification, the term "video" generally refers to both video data and the audio data that is associated with the video data.

A video source can be local (e.g., video file stored on a physical medium such as hard drive or a DVD) or remote (e.g., an Internet video streaming server). Often the video source is a remote server, Internet web server, or television station, but the video data from this remote station may be saved on a local storage before it is played back. The video data from the source can be distributed in many formats, including uncompressed video, as well as any compressed video formats such as the popular MPEG-2, MPEG-4, and other compressed formats.

Examples of video sources include, but are not limited to, direct broadcast using wireless television or radio signals, cable television, fiber optic cable, digital internet data packets such as TCP/IP, Bit torrent, Dirac, HTTP, streaming video, RSS, windows media video, QuickTime video, RealVideo, and others. The video source can also be transmitted by physical media, such as CD, DVD, HD, Blue Ray disks, tape such as VHS, D-VHS, Beta, Betacam, Digital Betacam, HDCam, DV, MiniDV, Digital8, or other tape media. The video source may also be video files stored on hard drives, and solid state memory such as flash cards and the like.

In general, the video source does not need to be a single physical entity, and can be multiple different sources and/or distribution methods.

Metadata Source

Generally, the metadata source, in its most abstract form, is information of potential use or interest to the user that is somehow linked the video data. This can be information that is linked to the video media itself, information that is linked to various image objects stored in the video media, information that is linked to various sounds stored in the video media, and so on. Thus metadata refers to the representation, storage and distribution of essentially any type of other data that is associated with video data that may come from the video source.

Typically, metadata may come in one of several different ways. Metadata may be associated together with video data, packaged in some virtual container (e.g., Adobe Flash™) that allows storage and transmission of both video and metadata. Such content may be created by standard authoring tools such as Adobe Flash™, VideoClix™, Asterpix™, Adivi™, Riva Producer™, or other methods. It may be conveyed by many different formats, including MPEG-47, Flash, Shockwave and Silverlight. Suitable examples of such methods can be seen in U.S. Pat. No. 6,462,754 and others. In this case, video source and metadata source are the same entity. Another example is subtitle information stored on a read-only media such as DVD or BluRay.

Metadata may be synchronized with the video data. In one embodiment, the metadata is packaged in a separate container and may be synchronized with the video data in such a way that, given a spatio-temporal location in the video data, it is possible to retrieve the corresponding annotation. An example of metadata represented in this way is shown and described in more detail below. The MPEG-7 format can be used to represent such metadata.

The metadata can be streamed together with the video stream from the same source (in which case the video source and metadata source are the same entity), or streamed from different sources (in which case the video source and metadata source are two separate entities). In the latter case, the metadata may be pre-stored on some local or remote storage device.

Metadata maybe utilized independently from the video data (distributed metadata). The video data may carry no reference or link whatsoever to the metadata. The metadata can be stored independently either on a local storage or remote storage. The video data is synchronized with the metadata using a video signature layer, for example by comparing the signature pre-computed and associated with the metadata and the signature computed from the video data.

In one embodiment, the metadata is transferred on demand following a user action. Alternatively, the metadata can be transferred in advance, in a pre-fetching manner. Metadata may be utilized on demand, where there is no specific metadata associated with the video data. In this embodiment, in response to a user action, metadata is generated by analysis of the video data. For example, metadata may be generated by performing object recognition followed by a semantic (textual) search. Alternatively, the metadata may be a result of an image-based search. In a particular situation, the entire Internet may be considered as a metadata source.

Metadata may also be a result of the user annotation, or more generally, community annotation of the video content. Thus, it may be user-generated in response to a user annotation. Such metadata can be stored locally, remotely, or in a distributed manner.

In general, the metadata source does not need to be a single physical entity, and can be multiple different sources and/or distribution methods. Those skilled in the art will understand that different embodiments may result from known technology, given this specification and drawings.

Primary video display: The primary video display generically refers to any video display device such as a CRT, LCD, plasma monitor or a projection device. Typically, the primary video display will be a wide screen television, high definition television (HDTV), video projector, other video monitor, or any other type of display device. In the most general form, however, the primary video display can simply be any alternate video display, other than the video display on the remote control, where the video program is viewed, and it may be yet another display on a remote control.

In some cases, for example in an aircraft or automobile, where multiple video screens play back a video program from a common source, there may be more than one primary video display.

The video display is connected directly or indirectly (e.g., through a media router or equivalent device) to the video source. For example, it can be an antenna connection, a digital HDMI or DVI connection, an analog VGA or component connection, or other connection. The video display can also be a networked digital TV (NDTV) and have a wired or wireless connection to remote video sources such as Internet streaming servers.

Hypervideo Remote Control

In one embodiment of the invention, the hypervideo remote control (simply referred to as remote control for brevity) may be implemented via a user interface through which the user can interact with the video content. The remote control may be powered by a direct wire connection to a power source, but often will be powered by its own internal battery. This battery may be one-time use, but often it will be useful to employ a rechargeable battery, such as a nickel metal hydride (NiMH), lithium ion (Li-ion), or lithium ion polymer (Li-ion polymer) battery.

In particular implementations, the remote control of the present invention is designed to be a self contained hand-held unit and may include a robust enclosure that will stand up to normal mishandling and abuse.

In addition to the novel remote control functionality described herein, the remote control may additionally perform optional conventional control functions. That is, the remote control may optionally function as a universal remote control and control other devices, including non-video devices, cordless or cellular phone, personal computer, a video-conferencing device, video and audio blogs and other peer-to-peer video (or audio/video) applications.

Additionally, the remote control functionality of the present invention can be embedded in other devices, such as personal digital assistants (PDAs) and cell phone devices. Suitable devices where the functionality of the present invention may be embedded include the Apple iPhone, Blackberry cell phones, smart phones such as the Palm Treo line of phones, and other cell phones such as cell phones that operate using the Microsoft Windows Mobile OS.

The functionality of the remote device can be implemented in software running on the processing unit, in hardware, or a combination thereof. In one embodiment, the functionality of the remote device is a hypervideo client, receiving video data and metadata, inputting the user action, retrieving the corresponding metadata and performing the corresponding action. In another embodiment, the remote device receives the video data, generates video signatures and uses them to retrieve metadata corresponding to the user action and performing the action corresponding to the metadata.

In yet another embodiment, the remote device acts as a user interface and video display, while the functions of metadata retrieval are carried out elsewhere, for example, on the media router or a remote server.

Media Router

The term "media router" is used here as a generic term to encompass the device that acts as the local video and video metadata server to the system. The main function of the media router is to receive video data from a video source and transmit it to primary display devices and remote devices in a synchronized manner. In some embodiments, the video data transmitted to the remote device will be a downscaled version of the video data transmitted to the primary display device.

In some embodiments, the media router may also receive the metadata and transmit them to the remote device. In other embodiments, the media router is used to retrieve the metadata according to information received from the remote device.

One example of a media router is a "set-top" box. Although the term "set-top" box is frequently used throughout this specification as a specific type of media router, it should be understood that the "set-top box" specific implementation of a media router is not intended to limit the scope of the invention.

The term "set-top box" originated in the days of cable television, where converter boxes were required to intercept the cable television signal, and convert the cable signal to a video form that could be interpreted by the television. This circuitry was often put into small boxes that perched on top of the television set, hence the term "set-top box". The term gradually came to encompass a wide range of separate television video processing peripherals. The "box" itself is often not actually located on top of the television or video monitor, but can be located underneath the monitor, or nearby the monitor, and connected to the monitor by suitable signal transmitting cables, optical fiber, or short-range As generally used today, "set-top box" encompasses television peripherals that take in signals from a broad variety of sources, including cable, but also including Ethernet, telephone lines (DSL), satellite dish antennas, and broadband signals from a variety of sources such as radio and power line sources. The set-top box functions to tune in to the desired program material, and convert the variety of different signals into a format that can be recognized by a video monitor.

Set-top boxes today can do many functions in addition to video conversion. Some function as video recorders and players, some record and play back separate video storage media such as DVD and blue ray disks, some function to upload and download internet content, and some also function as video game units. Some are built into the television monitor itself. The functionality taught in this disclosure is generally compatible with any and all of these prior set-top box functions, and thus may be considered to be additional set-top box functionality that can be combined with prior set-top box functions as desired by the manufacturer and user.

As an example, a media router may also incorporate a TV or radio antenna (and tuner), cable connection, and personal video recorder (PVR) interactivity. Other examples of a device understood here under then name of a media router may include: a wired or wireless network router, a network router with video streaming capabilities, a media adaptor such as AppleTV™, a game console such as PlayStation™ or X-box™, or a media player such as a DVD or Blu-Ray™ player. In particular embodiments, the media router and the video source can be the same entity.

Now that the background aspects of the various components of the invention have been discussed, some specific examples of how the invention may utilize these components will be provided. These examples are not intended to be limiting. As desired, the devices may apportion the functions between themselves and also other remote devices in other combinations and permutations.

As previously discussed, the media router or set-top box will normally contain or receive the program video. The set-top box will send the video to the main video display, and simultaneously (that is in a time synchronized manner) send the video to the remote control display. Since the remote control display will often be smaller than the main video display, and since the remote control will often communicate with the set-top box via radio signals, such as Bluetooth radio signals, that may have less bandwidth than is optimal to deliver the original video signal, the set-top box will often send a compressed or downsized version of the video to the remote control device.

The media router/set-top box will also examine the video metadata that is linked with the video signal, and send at least a portion of this video metadata to the remote control as well. Often the portions of the video metadata that are sent to the remote control will be information pertaining to the various video objects being shown where additional metadata is available. This may include bounding box information that shows the approximate boundaries and time codes (or frame numbers) where various metadata linked objects in the video image are available. The portions of the video metadata may also include small icons or lower size and resolution images of the recognized objects (for picture-in-picture display of the recognized objects). The portions of the video metadata may also include silhouettes or edges of the recognized objects, so that these objects can be emphasized or highlighted in the remote control.

The set-top box may also send additional information as well, such as a brief description of the recognized object (the object's name, price, availability, or hypertext link to an internet web site, etc.) so that a user using the remote control can immediately see additional information on the object of interest without the need of sending an additional query back to the set-top box.

Often however, the set-top box may be configured to respond to additional object queries sent back from the user's remote control. This response may include sending additional metadata to the remote control upon request, and querying outside sources (such as various internet web sites) for additional requested information.

Program control: In some embodiments, it may be useful to configure the remote control and media router to keep track of the time when the user's remote control device is not displaying a synchronized image of the same video being shown on the main video display. For example, a user may be viewing a remote control display screen containing additional information about an item of interest, and thus may be missing (or out of synchronization) with the video being shown on the main video display. In this case, it may be useful for the media router to keep a copy of the video that the remote control user has missed. When the remote control user has finished viewing the object metadata, and is interested in returning to viewing the program shown on the main video display, the user might request the media router to send a time-compressed "synopsis" version of the missed video to the remote control. Thus, a user who has failed to watch the main video during a minute of off-line remote control metadata viewing might request a 10 second clip containing a high speed playback of the missed minute, and once again then synchronize the remote control display screen with the main video display.

As previously discussed, in other embodiments, the media router may be configured to send an edited or redacted version of the video program to the user's remote control. For example, a user may indicate a high interest in an object, and wish to only view video that contains the object. In this case the media router may receive the request, search its memory for video scenes where the associated video metadata indicates that the object is present, and send just these scenes to the remote control. When the user is done viewing the edited or redacted video, the media router may again briefly (and optionally) display a clip of the missed video, and return to sending the remote control video that is synchronized with the main video display again. Alternatively the media router may abruptly switch to sending the remote control video that is synchronized with the main video display again.

Upon user command, the media router may echo the display being shown on the remote control to the main video display as well. This may be useful in situations where the remote control user has found metadata of particular interest to the group watching the main video display, and wishes to share his or her findings with the group. The media router may be configured to respond to standard video control signals, such as stop, start, channel change, etc. coming from the remote control as well.

Remote control: As previously discussed, the remote control has both an ability to receive and display a copy of the video that is being displayed on the main video screen, and also an ability to inform the user as to what objects in the video screen. This can often be done visually by using the metadata sent by the media router to highlight the metadata linked object or objects of interest in the scene, show a small picture-in-picture of icons or small photos of recognized objects, putting an arrow or marker over the metadata linked objects (recognized objects) or by other means.

The user will then interact with the remote control by various means, such as pushing buttons on the surface of the remote control, manipulating a mouse or mouse-like device on the remote control, touching the screen of the remote control, voice command, or other means. Usually when the user has indicated the object of interest, the remote control will then search its onboard memory for additional metadata pertaining to the object that had been previously sent by the media router, and then display this on the remote control's screen, either in a separate page, as an overlay on top of the video, by audio response, or other means. If additional metadata is not available on the remote control's local memory, and or the user indicates that additional information is desired, the remote control can then send a request for additional metadata pertaining to the object to either the local media router, or alternatively to another location, such as a remote internet web site. For example, if the metadata received from the media router included an internet universal resource locator (URL), the remote control may elect to contact the web site or other data source referred to by the URL directly, rather than through the media router.

Many other remote control functions are also possible. A partial list of these other functions includes: watching a different angle of the content displayed by the media, creating a panoramic view of the content displayed by the media, creating a multi-angle view of the content displayed by the media, displaying the recognized and selected object in a stroboscopic view, panning the display or playback of the media to follow the recognized and selected object, watching a different version of the content displayed by the media, generating a map of the content, generating a virtual picture in a picture of the content, fast forwarding to the next instance of the object in the media, rewinding to the previous instance of the object in the media, displaying an edited version of the media consisting of just scenes where the object is present, displaying a redacted version of the media consisting of just scenes where the object is absent, removing the object from the media, removing the object from the media and attempting to reconstruct the image behind the object. Still other functions include annotating the object, annotating the object for limited access, annotating the object for general access, editing the content based on rating and/or parental control, point on a hyperlink on the content, doing unobtrusive channel sampling of the content, doing unobtrusive content navigation, doing unobtrusive access to content EPG, getting unobtrusive access to content metadata (previously discussed), and used to display a media selection guide. Still other functions include displaying menu choices, transmitting an action request to the network, sending a control command to the media display device, sending a control command to the remote server, doing video object based library indexing and search, doing video object based network search, doing video object based advertising, doing user on demand view, doing content synchronization with a television device or video recording device, enabling interactivity with the content, doing channel sampling, and sending the media to a cellular telephone. Many other applications can also be performed.

For example, from a commerce standpoint, some of these other applications can include updating the metadata information, reading the additional metadata information, listening to the additional metadata information, storing the additional metadata information, printing out the additional metadata information, ordering, bookmarking, requesting further additional information, sending purchase information, transferring the additional information to another device, and transferring the additional information to another person.

In still other embodiments of the invention, the remote control device will have its own onboard camera, so that the remote control device may itself produce an image of the main video display. In this case, the remote control may be connected to a remote server. This remote server can search the images sent by the remote control for recognized object features, and if found, can send back metadata appropriate to the recognized features. Using this technique, a person could bring the remote control device to a movie and make use of the device, or even use the device in a real life situation in order to analyze real life images, and provide appropriate annotation information.

FIG. 1 describes a typical structure of video content and the metadata associated with video objects. The video data 100 can be thought of a three-dimensional array of pixels. The array has two spatial dimensions x,y and one temporal dimension t. A point 101 in the array can be represented by the spatio-temporal coordinates (x,y,t). A video object 126 (a house) appears a contiguous region of pixels in this array.

The metadata 102 consist of two structures: object description structure 170 and object annotation structure 180. Object description structure 170 contains a list of object IDs (identifications) and some representation of the corresponding objects, allowing, given the spatio-temporal coordinate (x,y, t), the object ID to be extracted or determined. For example, given the spatio-temporal coordinates 101 of the house object 126, the house object description 174 is used to determine that the spatio-temporal coordinates 101 belongs to an object with ID 172.

The object ID 172 inferred from the data structure 170 is used to retrieve the annotation 138 associated with the house object. The annotation data structure 180 contains a list of object IDs and the annotations associated therewith.

Figure 2:
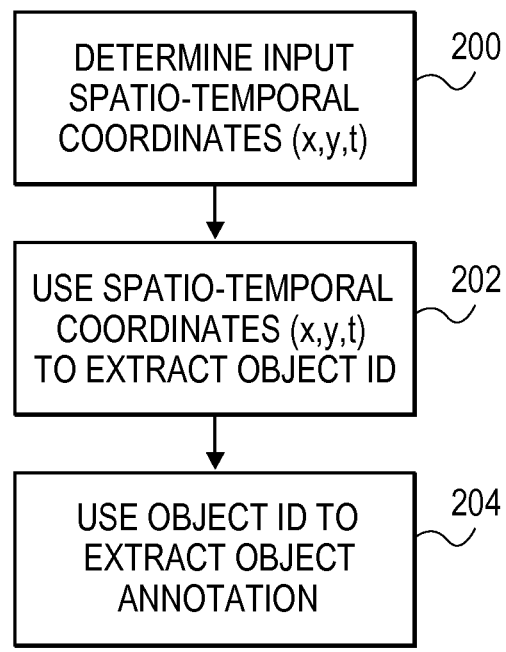
FIG. 2 shows an exemplary scheme of retrieving metadata associated with a spatio-temporal location in video data upon a user action.

An example process of metadata retrieval upon user action is schematically described in FIG. 2 and consists of three stages. First, upon user input (e.g., a mouse click), the spatio-temporal coordinates 101 of the input (mouse cursor) are determined (block 200). Second, the spatio-temporal coordinates are used to extract the object ID 172 from the object description structure 170 (block 202). Third, the object ID 172 is used to extract the annotation 138 from the annotation structure 180 (block 204).

Figure 3:
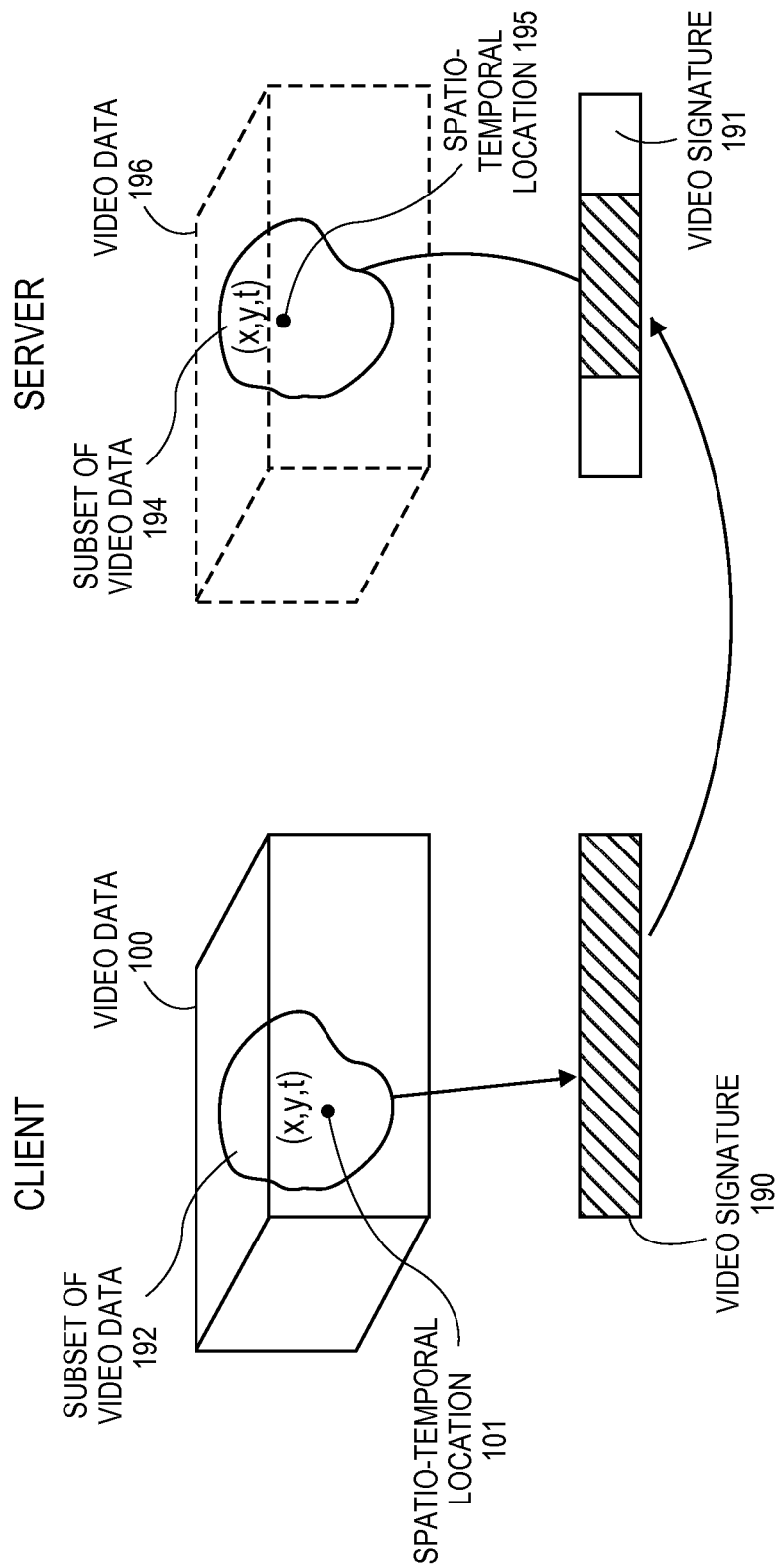
FIG. 3 shows an exemplary structure of distributed metadata in a client/server system where the video data is available at the client and the metadata is available at the server.

FIG. 3 shows an example of video signatures and associated links between the server and the client content. First, at a pre-processing stage on the server side, video data 196 goes through a process of analysis, which produces a video signature 191, associated with different spatio-temporal locations 195 in the video data 196. The computation of the signature associated with spatio-temporal location 195 is based on a sub-set of video data 194 in the neighborhood of this location. The video signature 191 is then preserved on the server, while the content 196 can be deleted.

On the client side, the video signature 190 associated with a spatio-temporal location 101 in other video data 100, similar to video data 196 can be computed either during real-time during video playback, or alternatively on a non real-time basis in advance of playback. The video signature 190 is computed based on a sub-set of video data 192 in the neighborhood of spatio-temporal location 101. Signature 190 is transmitted to the server, where the signature is then compared to other stored signatures using a matching process. The matching process finds a matching portion of video signature 191, and the associated spatio-temporal location 195 is extracted.

This way, the client-side spatio-temporal coordinates (x,y, t) are translated into server-side spatio-temporal coordinates (x',y',t'), which are used to extract the metadata associated with the object. Thus, clicking on the object in client-side content, the user receives metadata associated with the same object that was annotated on the server side.

Figure 4:
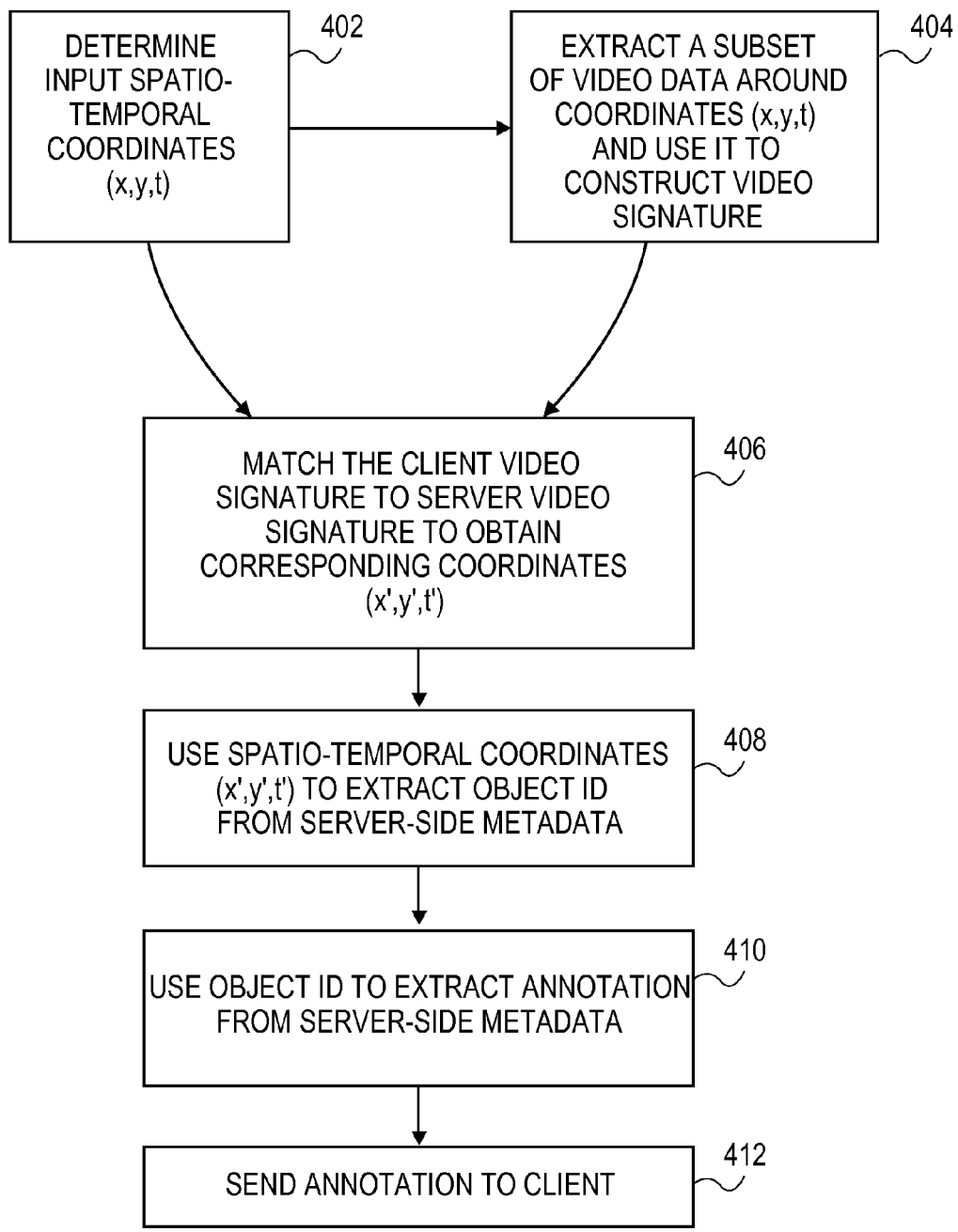
FIG. 4 shows an exemplary scheme of retrieving from a server of distributed metadata associated with a spatio-temporal location in video on a client data upon a user action.

An example of this process shown in FIG. 4 and consists of the following stages. First, upon user input (e.g. mouse click), the spatio-temporal coordinates (x,y,t) of the input (mouse cursor) are determined (block 402). Second, a subset of video data around these spatio-temporal coordinates is used to compute the client video signature (block 404). Third, the client video signature and the coordinates are sent to the server and compared to server video signatures, obtaining this way the corresponding coordinates (x',y',t') as shown in block 406. Fourth, coordinates (x',y',t') are used to extract the object ID from the object description structure in server-side metadata (block 408). Fifth, the object ID is used to extract the object annotation from the annotation structure in the server-side metadata (block 410). Sixth, the annotation is sent to the client (block 412).

Figure 5:
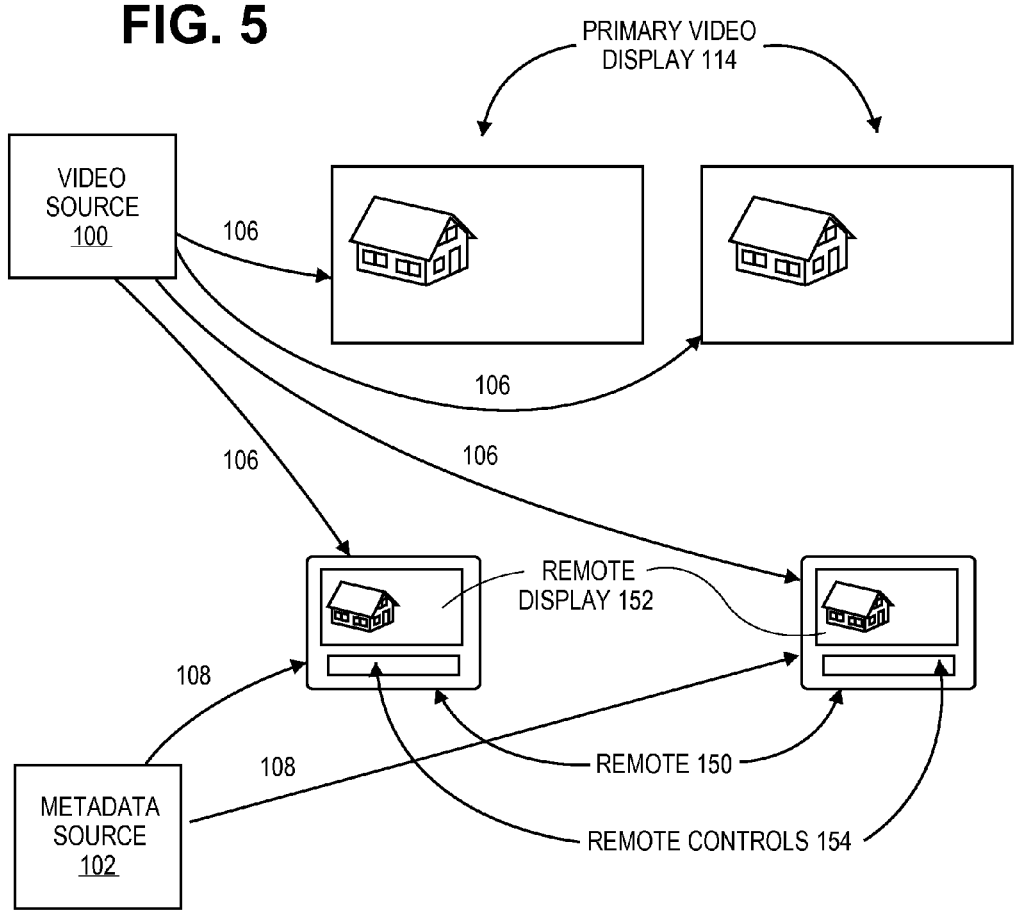
FIG. 5 shows the components of the hypervideo remote control system according to the present invention.

A particular implementation of the present invention is a system consisting of multiple components, such as shown in FIG. 5. These components include: one or more hypervideo remote control devices 150, one or more primary video displays 114, a metadata source 102 and a video source 100. A previously discussed, throughout this disclosure, unless otherwise incompatible with its local context or explicitly stated, the term "video" generally comprises both video and the audio signals associated with the video.

In a typical operation scenario, video data 106 from the video source 100 are transmitted to the primary displays 114 and to the remote devices 150 in a synchronized manner, in such a way that most of the time, the image displayed on the primary display 114 corresponds to the image displayed on the remote display 152. The video data displayed on the remote display 152 can be a processed version of the video data displayed on the primary display 114, processing including, for example, compression, filtering, spatial and temporal resolution change, etc. Metadata 108 is communicated from metadata source 102 to remote devices 150.

Through the remote controls 154, the user interacts with the video displayed on the remote device 152. The remote controls may include a pointing device, allowing to select objects in the displayed video. One implementation of the pointing device can be a touch screen interface, allowing the user to select objects by touching them.

Figure 6:
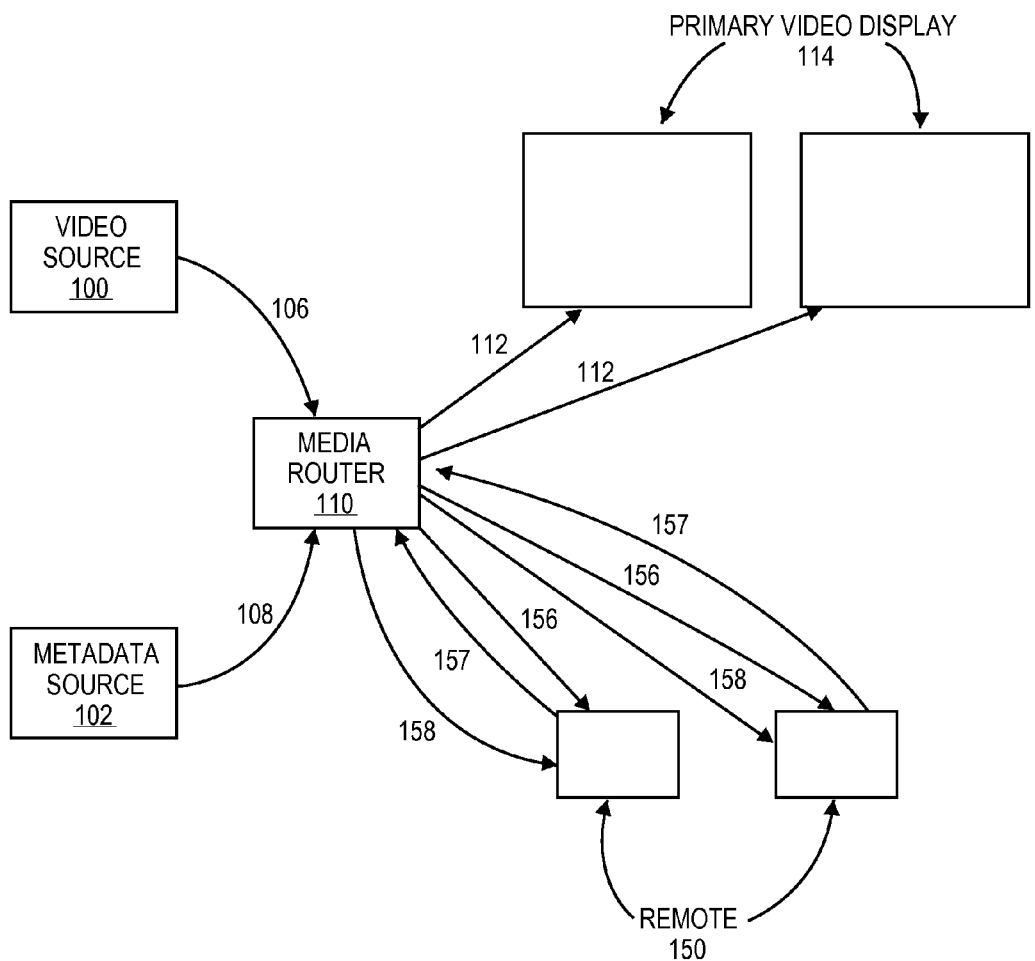
FIG. 6 shows a different configuration of the hypervideo remote control system according to the present invention where a media router is used to transfer video data to the primary video display and the remote control devices and the metadata to the remote control devices.

A different configuration of the system is shown in FIG. 6. It further includes a media router 110. The video data 106 from the video source 100 and the metadata 108 from the metadata source 102 is first transmitted to the media router 110. The media router 110 then transmits video data 112 to the primary video display 114 and video data 156 to the remote devices 150. The video data 156 may be a downscaled and compressed version of the video data 112 sent to the primary video display 114. The media router 110 in this configuration can carry the role of synchronizing the video data 112 and 156.

In one implementation, upon a user action on the remote device 150, a request for metadata 157 is sent from the remote device to the media router 110. The request may include, for example, the video signature and the spatio-temporal coordinates of the objects selected by the user. The media router sends the corresponding metadata 158 to the remote devices 150, which performs the action described in the metadata.

Figure 7:
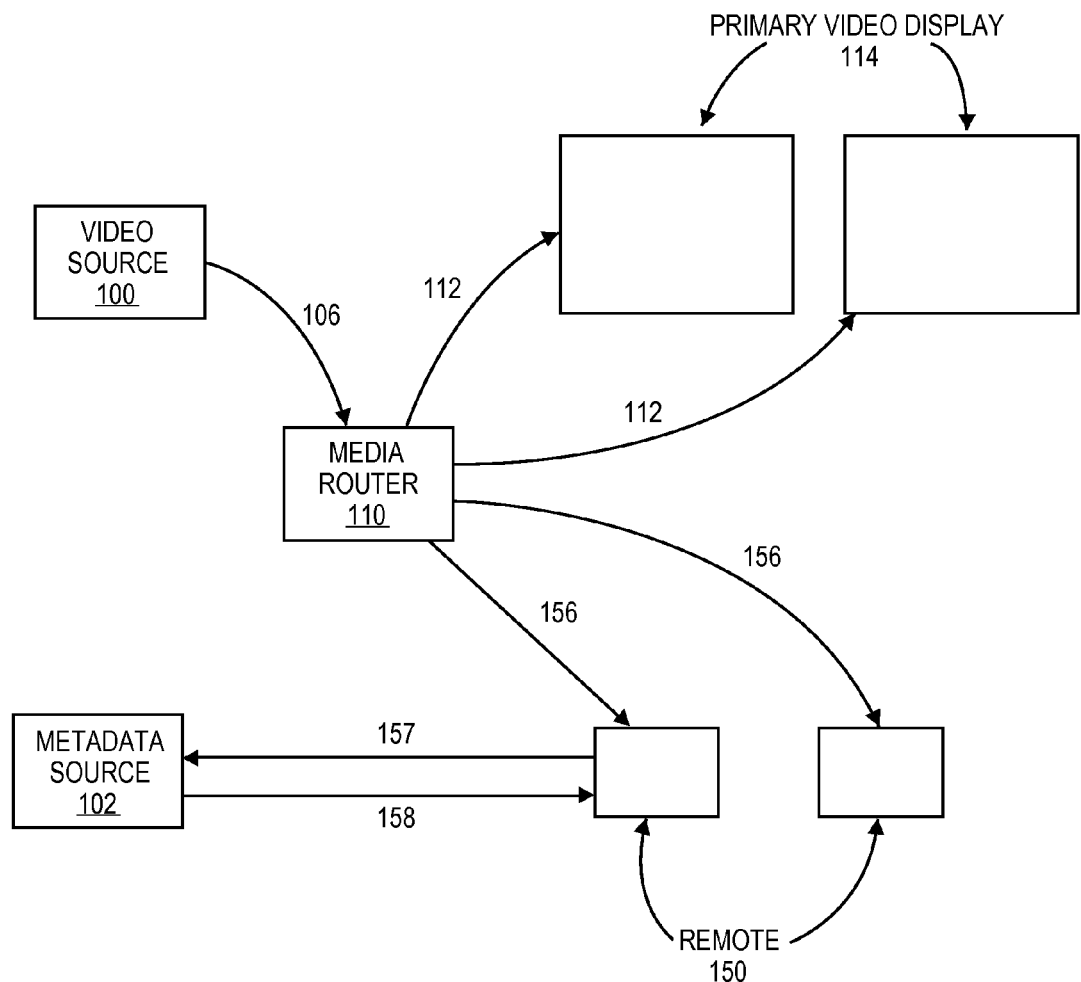
FIG. 7 shows a different configuration of the hypervideo remote control system according to the present invention where a media router is used to transfer video data to the primary video display and the remote control devices.

In another configuration of the system depicted in FIG. 7, the media router 110 is used to transmit video data only. The metadata exchange is performed directly with the remote devices 150, which send a metadata requests 157 to the metadata source 102 and receives the corresponding metadata 158.

Figure 8:
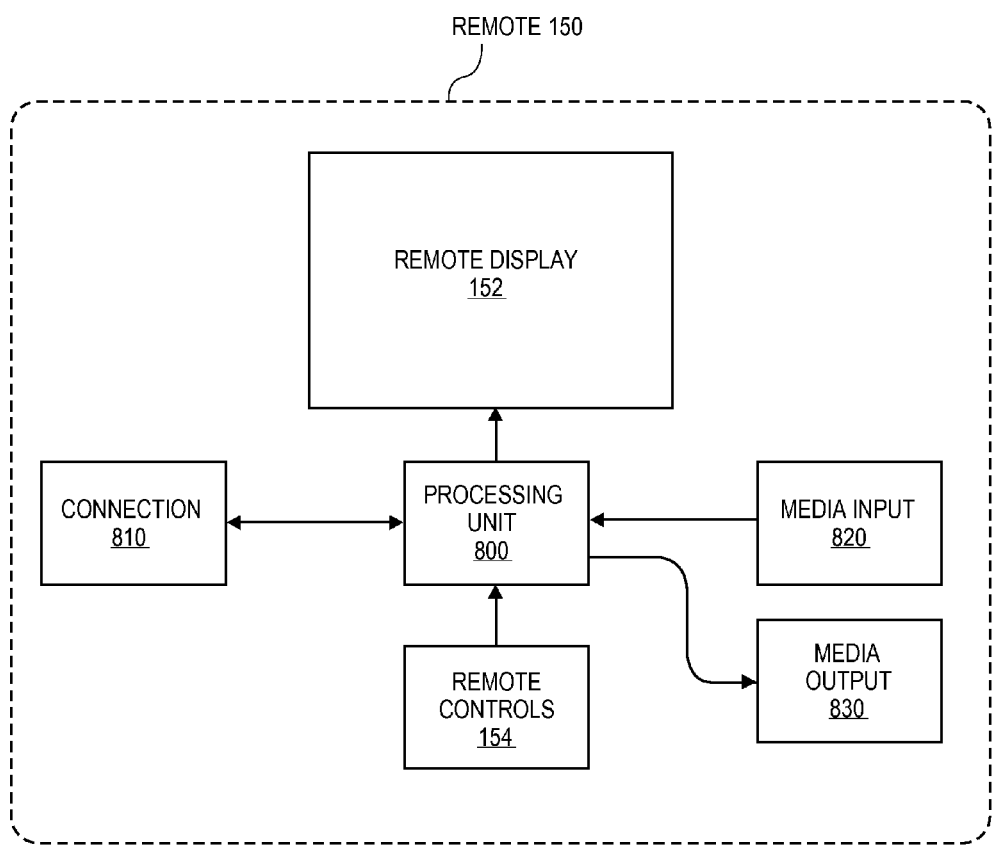
FIG. 8 shows the components of the hypervideo remote control device according to the present invention.

An abstract scheme of a remote device is depicted in FIG. 8. The components of the scheme are separate for clarity. There is no requirement that each discussed component actually be present in a physically distinct enclosure, module, or component. In some embodiments it may be convenient to physically place two or more of the components into the same component, module, or other enclosure.

A remote device 150 comprises a remote display device 152 on which video data and actions are displayed, remote controls 154 through which the user interacts, connection 810 through which the remote device processing unit communicates with the video and metadata sources or with the media router, media input 820 through which additional user input can be received, media output 830 through which additional actions can be output, and a processing unit 800, including a processor with appropriate electronic circuitry and memory, on which the interface is implemented.

Media input 820 can include a microphone, a still image or a video camera. Media output 830 can include a speaker or a headphone jack, or a port connecting to other media devices, such port being, for example, VGA, DVI, HDMI, etc. Connection 810 can be a wired or a wireless connection, including but not limited to signal transmitting wire or fiber optic link, or by wireless means, including infrared signals, 802.11 Wi-Fi, 802.15 Bluetooth, or other digital radio capable of receiving digital information at a fast enough rate to display moving images and associated metadata on the remote control's screen.

Processing unit 800 may be a combination of processors, microcontrollers, application specific integrated circuits, memory and storage devices, necessary for and allowing the implementation of the user interface and handling all the functions of the remote device. The remote control will often be battery operated, and thus low power electronic circuitry is often preferred. Examples of low power but powerful processors suitable for the remote control include processors (or microcontrollers) compatible with the ARM, MIPS, X86, Alpha, Power-PC, 8051, and MSP430 instruction sets. For handling the video functionality, use of digital signal processors (DSP) may also be desirable, and this DSP may be packaged with the processor in a system on chip (SoC) format as desired. The remote control circuitry will often contain its software programs stored in persistent memory, such as Flash, ROM, or battery backed up RAM memory. The remote control circuitry will often also contain sufficient random access memory, such as RAM, to hold video images and at least a portion of the metadata associated with the video images. In some cases, use of a miniature hard-drive enable the remote control to buffer and store the incoming video and metadata signal, and allow the user to rapidly and privately advance through the buffered video signal may be useful. In other cases, this functionality can be accomplished through the use of adequate amounts of onboard solid state memory.

The remote controls 154 may include a pointing device and additional controls such as buttons or triggers. A pointing device can include a wired or wireless mouse, a trackball, a trackpad, a touchscreen, or a gesture-based interface.

Figure 9:
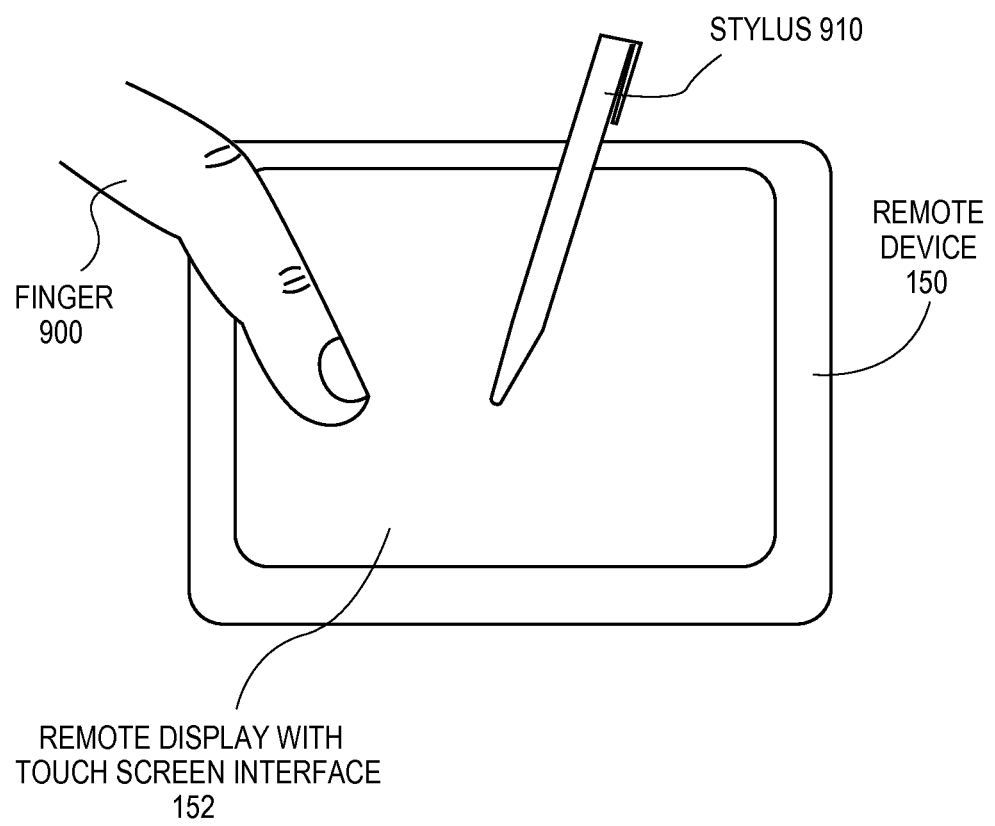
FIG. 9 shows an embodiment of the hypervideo remote control device with a touchscreen interface.

In one embodiment, depicted in FIG. 9, the pointing device is implemented as a touchscreen 152 and is integrated into the remote display. The interaction with the remote display/touchscreen 152 is carried out using a finger 900 or a stylus 910.

Figure 10:
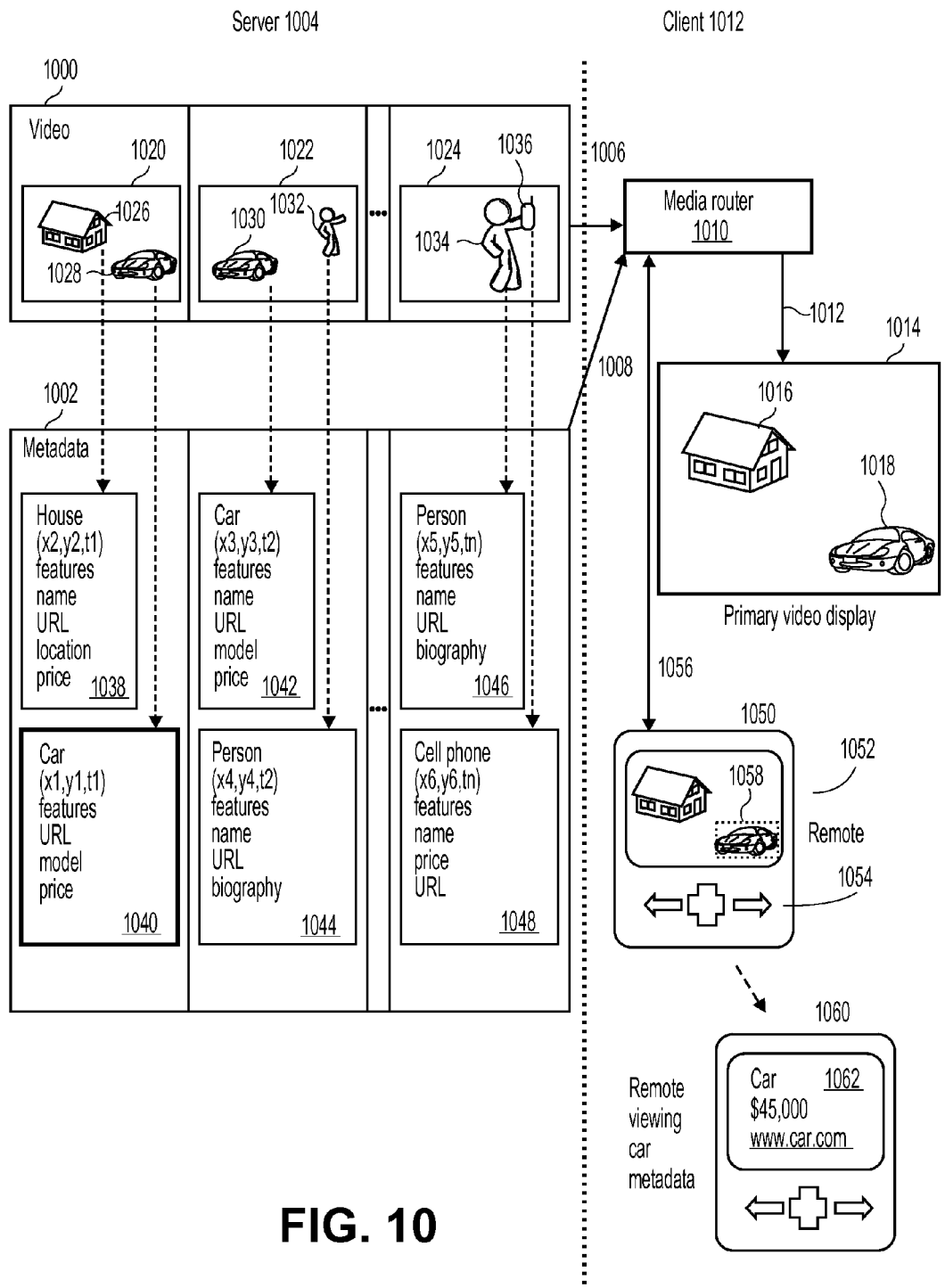
FIG. 10 shows an overview of the video and video metadata data structures, as well as how these data structures interact with a media router, main video display, and a handheld metadata remote control equipped with its own display.

FIG. 10 shows an example of the video and video metadata data structures, as well as how these data structures interact with a media router, main video display, and a handheld remote control equipped with its own display.

In this example, the video file 1000 and the video metadata file 1002 (which may also be different data fields on the same file as desired) are assumed to reside on a remote server 1004, which may be a television station, internet website, or a multimedia player playing both types of files. This remote server 1004 in turn is sending the video 1006 and video metadata 1008 to a media router (such as a set-top box) 1010 that may be nearby the user or client. Alternatively this data 1000, 1002 may have been sent previously to the media router 1010 and is now residing in the media router memory (such as a set-top box hard drive, CD, DVD, HD or Blu Ray disk, or solid-state memory).

Assuming that the media router 1010 has been directed to play the video content, the media router 1010 sends the video (video and audio) signal 1012 to the main video monitor or display 1014. This primary or main display will often be a larger television or HDTV monitor or monitors, designed for communal viewing. In this example the main video monitor is showing an image of a house 1016 and an automobile 1018 driving outside the house.

The data to display the audio and video shown on the main video display is stored in video file 1000, typically as a series of image frames. Although many commonly used digital video compression methods, such as MPEG-2, MPEG-4, and the like actually store different video image frames in terms of reference I frames (intraframes), that contain more complete image information, as well as P frames (predictive frames) and B frames (bidirectional frames), for this, this difference between image frame types is relatively unimportant, and to simplify matters, this difference will be ignored.

Thus the video 1000 can be viewed as consisting of a series of images 1020, 1022, 1024 and associated sounds from various portions of the video. Here image 1020 corresponds to the image presently being shown on the main video monitor 1014, and this image 1020 contains the information 1026 used to display the house 1016, and the information 1028 used to display the car 1018. The video 1000 also contains images from later scenes 1022, where the car 1030 is parked next to a person 1032. Still later in the video, in scene 1024, the person 1034 is carrying a cell phone 1036.

The video metadata 1002 can be viewed as a large database of information that can be stored on standard computer storage media (solid state memory, hard drives, tape, disks, etc.), transmitted using standard digital data transmission methods, and can be manipulated using standard computer database methods.

Although the video metadata 1002 is usually not shown on the main video 1014, here it is useful to examine the contents of video metadata 1002 in more detail. Potentially each object in each frame from the video file 1000 can be linked to its own set of video metadata in video metadata file 1002. Thus, for example, house object 1026 can be linked to house metadata 1038. Car object 1028 can be linked to car metadata 1040. The contents of this metadata can be quite varied. As an example, the house metadata 1038 may contain the name of the object, the spatial coordinates of the object, and/or the shape of the bounding box that encompasses the object, and the time sequence or frame number where the house object occurred. Here this data is symbolized by the "(x2, y3, t)" nomenclature. The house metadata may also contain information pertaining to artificial image recognition features of the object, such as the house SIFT features, etc. This information is symbolized by the "features" nomenclature.

Similarly car metadata 1040 may also contain the name of the object, its location coordinates, artificial image recognition features, and other information, such as the model number of the car, price of the car, and a url (universal resource locator) of a web site that is selling the car or which has more information about the car.

Note that the car object occurs in more than one video frame or scene, and the car object 1028 can also be seen in image 1022, where it is now represented as car 1030. Thus the video metadata for image frame 1022 also contains information about the car 1042. Note also that video image frame 1022 contains an image of a person 1032, such as an actor. Thus the video metadata 1044 associated with actor 1032 may contain other types of metadata. Here the name, coordinate, and artificial vision features of the actor are still relevant, but now the metadata may also contain other information such as the actor's biography and a link to a website featuring the actor.

In image 1024, we now see a close up of the actor 1034, and we now see that the actor is holding a cell phone 1036. Thus, the metadata 1046 associated with video image frame 1024 again contains information about the actor 1034. Additionally, the metadata 1048 associated with image frame 1024 also contains information about the cell phone.

In this example, the main video monitor 1014 is being watched by a viewer equipped with one embodiment of the invention's hand-held remote control 1050. This remote control has its own display 1052, and controls 1054. This remote control is receiving a downsized and synchronized version of the image being shown on the main monitor 1014 by a Bluetooth or other signal 1056 being sent by media router 1010. Here, the media router 1010 has also sent remote control 1050 information showing that the car in the image has associated metadata 1040. This is done by surrounding the car with a visual depiction of a bounding box 1058.

In this example, the user has used the controls 1054 to signal the media router 1010 that the user is interested in receiving more information 1040 about the car. The media router 1010 has sent this metadata 1040 to the remote control 1050, producing an updated display on the remote control 1060 that now contains the car price and URL hyperlink 1062 that had been previously stored in the video metadata 1040.

Figure 11:
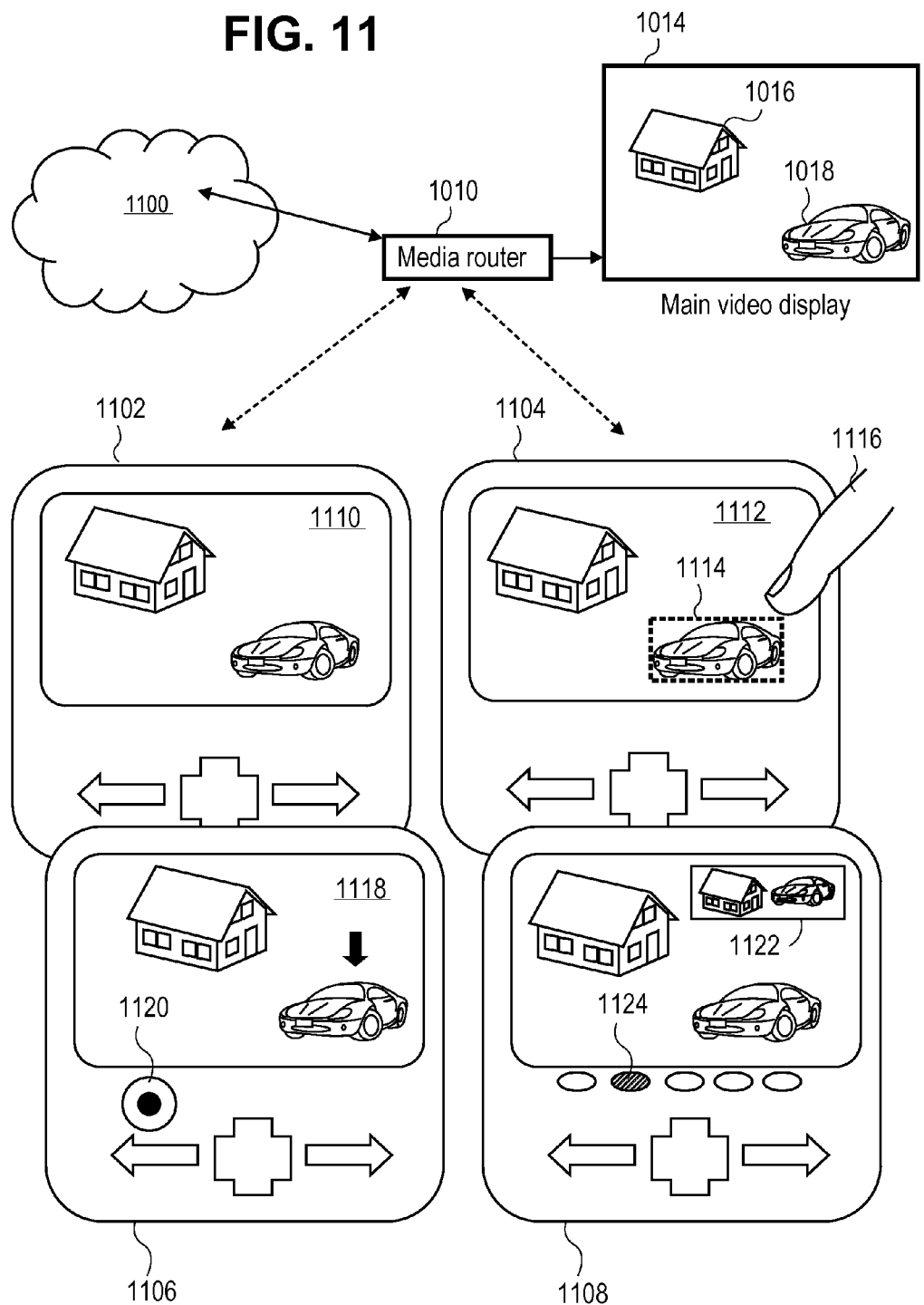
FIG. 11 shows a close up of the various ways in the handheld remote control can show a user which objects in a video scene have additional metadata available, as well as the various ways in which a user can point to and select an object to view the additional metadata.

FIG. 11 shows a close up of the various ways in the hand-held remote control can show a user which objects in a video scene have additional metadata available, as well as the various ways in which a user can point to and select an object to view the additional metadata.

In FIG. 11, media router 1010 is receiving or has received video data and video metadata from an outside source 1100. The media router 1010 is displaying the requested program on the primary or main video display 1014. Here the video program and the video metadata are the same as previously described in FIG. 10, and image 1020 is being displayed, which contains house 1016 and car 1018 again.

Here, four alternative embodiments of the remote control device 1102, 1104, 1106 and 1108 are shown. In embodiment 1102, the display 1110 on the remote control is simply showing the video display presently being shown on the main video display 1014. In embodiment 1104, the video display 1112 is a touch-screen video display, and the display 1112 is showing that the car is linked to video metadata by surrounding the car with a visible outline or bounding box 1114. Here a user finger 1116 is shown touching the bounding box 1114 on the touch sensitive display screen 1112 to select an object to retrieve further metadata information.

Remote control 1106 shows an alternative way to select objects. Here the remote control is designating that the car is linked to video metadata by displaying an arrow or cursor 1118. In this embodiment, the remote control has a finger position sensitive pointing device, such as a mouse-pad, trackball, or pressure sensitive button 1120 that the user uses to move the cursor 1118 and select the car.

Remote control 1108 shows another alternative way to select objects. Here the remote control is designating that the car is linked to video metadata by displaying icons of the recognized objects in a picture-in-a-picture display 1122. In this embodiment, the remote control has a series of buttons that can be used to select icons, and here the second button 1124 has been selected.

In another configuration, a finger position sensitive pointing device, such as a mouse-pad, trackball, or pressure sensitive button 1120 that the user uses to move the cursor 1118 can be used to select the car.

For some users, metadata alert methods might also include vibration, or audio signals. Such vibration or audio metadata alert signals may be particularly useful for handicapped users with limited vision. Thus for example, a person with limited vision might make use of the remote control with an optional speaker, Bluetooth earpiece, or earphone attachment. A limited vision version of the remote control might even have a brail-like tactile display screen for a user interface. For example, a display screen with a matrix of vibrating or raised pins or ridges that dynamically changes with the video image would allow a limited vision user to query the remote control as to more information about the content of the image.

In another alternative embodiment, the "mouse" or object pointing and selection functions of the remote control may instead be performed by a pointing device that is not part of the remote control's enclosure. This may be an external pointer or mouse that either plugs in to the remote control or sends pointing information to the remote control by infrared or radio signals. The external pointer or mouse may alternatively plug into the set-top box or send pointing information directly to the set-top box by infrared or radio signals.

Figure 12:
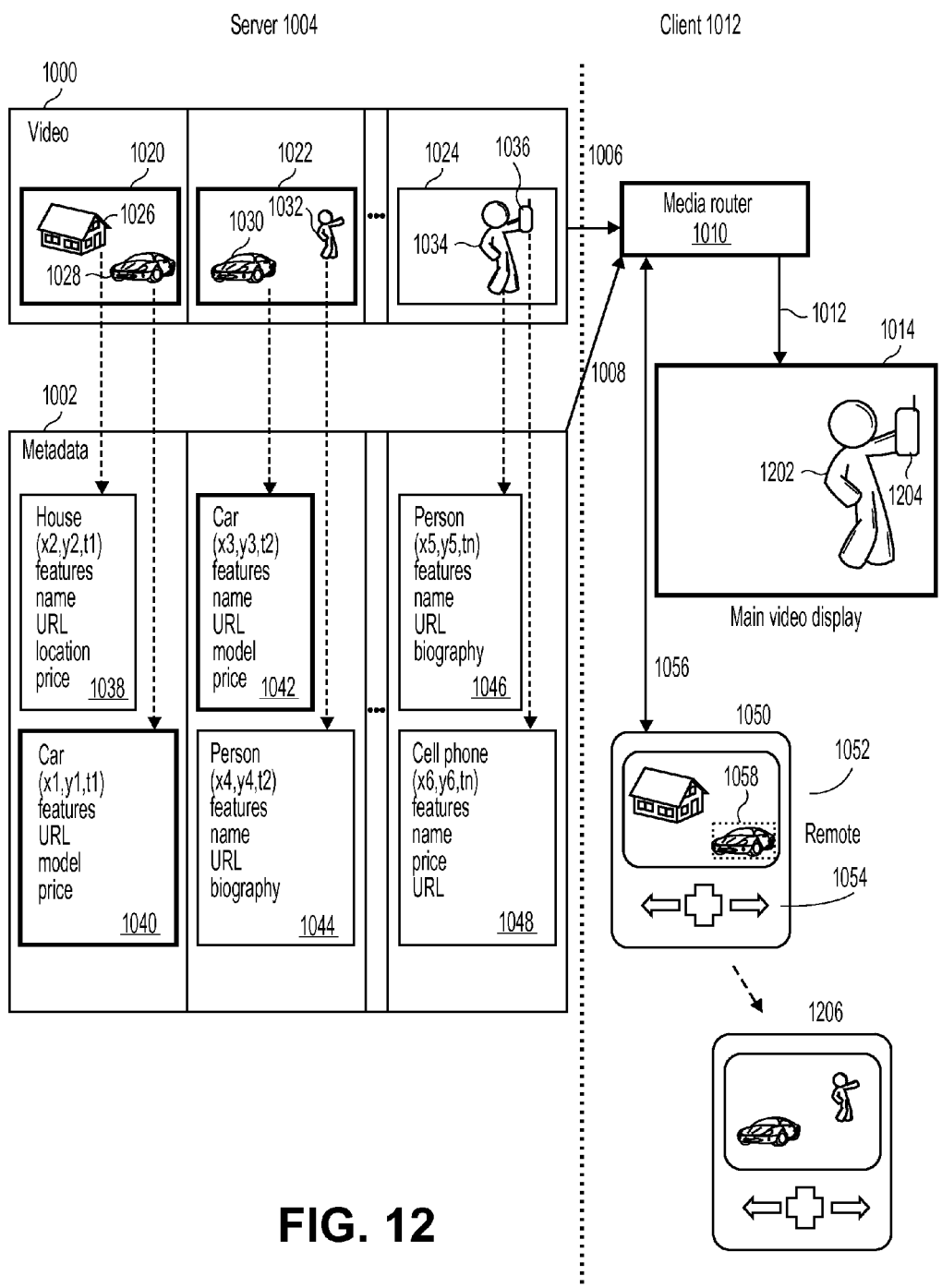
FIG. 12 shows an overview of the video and video metadata data structures, as well as how these data structures interact with a media router, main video display, and a handheld remote control equipped with its own display, and how a user can direct the system to show scenes containing an object of interest on a remote control.

FIG. 12 shows an overview of the video and video metadata data structures, as well as how these data structures interact with a media router 1010, main video display 1014, and a handheld remote control 1050 equipped with its own display 1052, and how a user can direct the system to only show scenes containing an object of interest on a remote control.

This example is similar to FIG. 10 except that here, the media router 1010 is now showing a different scene, scene or image 1024 from the same video file 1000. This image shows a larger view of the actor or actress 1202 and the cell phone 1204 from the image data 1034 and 1036 from image frame 1024.

In this example, the user of remote control 1050 had previously wished to use the metadata associated with the car to control the playback of the video on the user's remote control. Thus the user had again selected the automobile bounding box 1058, but had used the remote control keys 1054 to tell the remote control to in turn inform the set-top box to only play back scenes where the car object is present. The media router 1010 in turn has consulted the video metadata file 1002 and determined that the car metadata was present in data 1040 and 1042, which in turn were linked to video frames 1020 and 1022. The media router 1010 is thus playing back video scenes or images 1020 and 1022 on the remote control display, while the main video display is showing a different portion of the video 1024 that does not contain the car. These two scenes 1020 and 1022 are thus shown on the remote control as 1050 and 1206.

Both the handheld remote control and the media router contain their own computer processors and both handle digital video data streams and video associated metadata through independent software programs that run on each device. Although the processors and software on each device are normally independent, the remote control software and the media router software communicate with each other, and coordinate their various activities by this communication. An example of how the two sets of processors and software communicate with each other, as well as manipulate digital video files and video metadata files, is shown in FIG. 13.

Figure 13:
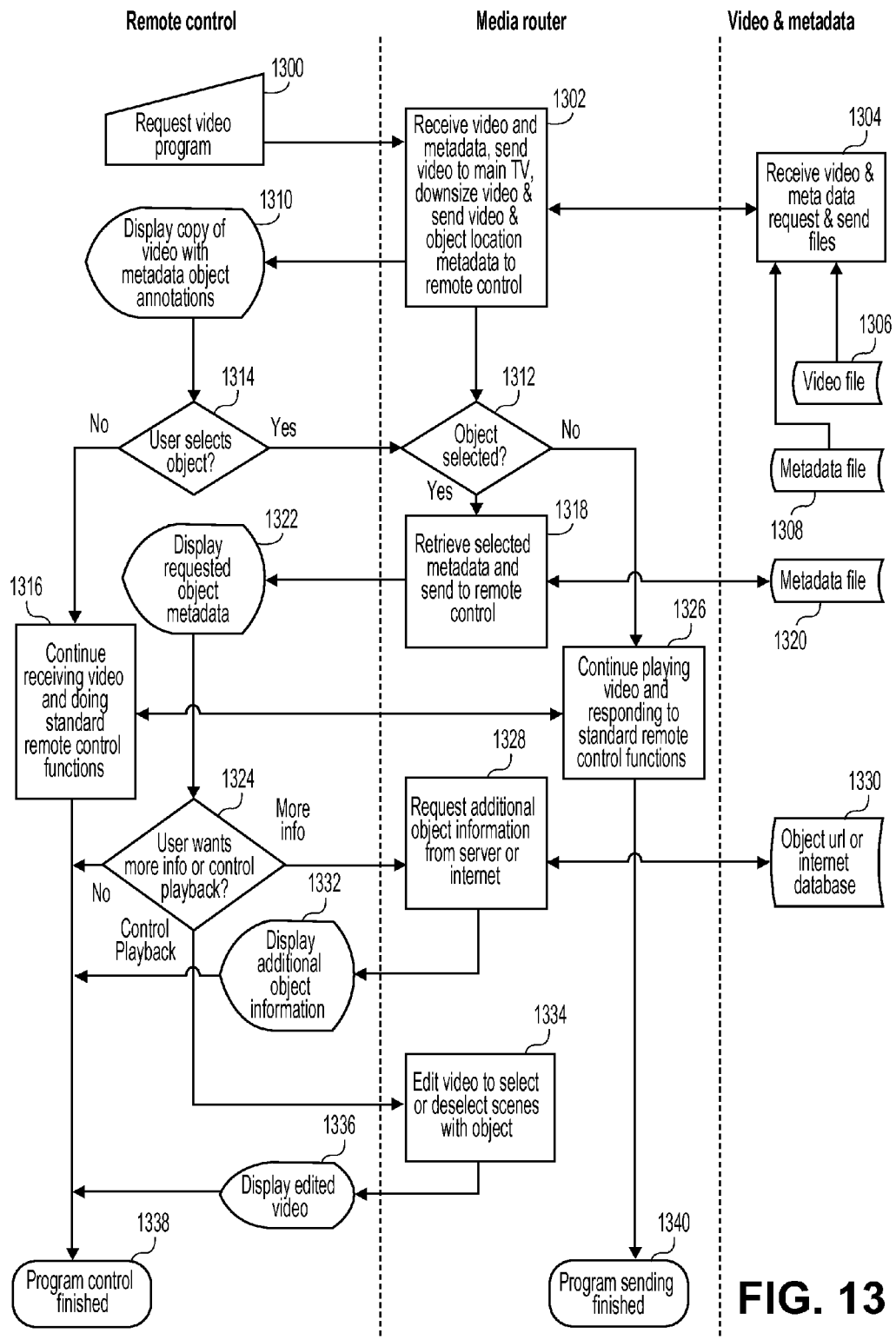
FIG. 13 shows an example of how the software and systems of a handheld remote control device may interact with the software and systems of a media router or similar device, and how this media router in turn may interact with local or remote video and metadata servers.

In the example of FIG. 13, the viewing session starts when the requests a video program using the user's remote control 1300. The remote control software directs the remote control hardware to send a video program request to the media router hardware, often by either a short-range radio signal (such as a Bluetooth or Wi-Fi signal), an infrared signal, by a direct wire connection, or by other means. This signal is then relayed to the media router software routine 1302. The media router software routine 1302 interprets this request, and finds the requested video program, either from the media router's internal memory or memory storage units, or alternatively from outside sources such as internet servers or video broadcasters 1304. Here it is assumed that the video data 1306 and video metadata 1308 have been stored external to the media router.

Once the media router software routine 1302 locates the desired video data 1306 and video metadata 1306, the media router begins to send the video information 1306 to the local main video display (not shown). Media router software 1302 also typically compresses or downsizes the video data 1306 enough to be compatible with the remote control's typically smaller video display, and more limited bandwidth, and sends a synchronized copy of the video signal to the remote control video receiving and display software routine 1310. Software routine 1302 also sends at least a portion of the metadata 1308, such as the space and time locations (bounding boxes) of the objects in the video that have metadata associated with them, to the remote control receiving and display software 1310 as well. Media router software routine 1302 also sends important video and metadata synchronization information to media router routine 1312 as well, which is responsible for coordinating further commands from the remote control.

Meanwhile, back on board the remote control, the remote control software continues to display video, highlight on the video what objects have linked metadata, and interpret user commands such as touch screen coordinates or mouse gestures. When the remote control command recognition software 1314 detects that the user has selected a metadata linked object, software 1314 directs the remote control hardware to send a message to the media router receiving hardware to inform media router routine 1312 that the user has selected a metadata linked video object. If the user does not select an object, software routine 1314 allows the remote control to continue to receive and display video, as well as to continue standard remote control functions (such as start, stop, channel change, volume, etc.). This "continue as normal" routine is designated as routine 1316.

Back at the media router, assuming that the user in 1314 has selected an object of interest, routine 1312 reads the message from the remote control and transfers control to routine 1318, which retrieves the requested metadata 1308 or 1320 that is linked with the selected object. Note that two possibilities exist. One possibility is that the user has requested information that was available in the original metadata file 1308, and the other possibility is that the user has requested extended information that may only be available from an alternate source (such as an internet web site). Set-top software routine 1318 will determine which metadata source 1308 or 1320 is most appropriate to serve the user's request, fetch the appropriate metadata, and then direct the set-top transmission hardware to send the requested metadata back to the user's remote control system.

Back at the remote control, the metadata is received and is transferred to software routine 1322, which displays the requested object metadata on the remote control's display. There the user can review the metadata and determine the next course of action. Here the user decision is represented as 1324. If at 1324, the user decides that no further information is needed, control passes back to the remote control routine 1316, which sends a message back to the set top box to instruct set-top box routine 1326 to continue streaming (compressed) video back to the remote control, possibly with a short optional "catch up clip" that allows the user to quickly review missed video at higher than normal speeds.

If, at step 1324, the user determines that still more additional information is desired (for example the user wishes to purchase a displayed product, and wants access to an internet store), then routine 1324 directs the remote control hardware to send a request for additional object information to the media/router set-top box hardware. The media router hardware in turn passes this request to media router routine 1328, which in turn retrieves the additional information which may be a link to an internet web site 1330 or other information source. This additional information 1330 in turn is relayed by the media router routine 1328 back to the remote control display, where it is handled and displayed by routine 1332, which may (in some embodiments) be an embedded remote control internet web browser routine. When the user is done working with the additional information 1330, control passes back to the remote control routine 1316, which again sends a message to the media router hardware to continue streaming synchronized compressed video to the remote control display.

If, at step 1324, the user determines that the user wishes to use the object metadata to control the playback of the media router (for example to direct the box to show only video scenes containing the selected object), then routine 1324 directs the remote control hardware to send a message to the media router hardware, which in turn passes the message to media router routine 1334 to use the object information to edit the video in the requested manner, using a process similar to that previously described in FIG. 12. The media router routine 1334 will perform the requested video editing process, and then direct the media router to send the edited video back to the remote control, where it can be displayed 1336.

These steps can continue in a looping manner until the program playback has finished, or indeed continue looping essentially forever as the user requests additional programs. For simplicity however here the process is shown terminating for both the remote control 1338 and the media router 1340.

Note that the media router may be designed to work with multiple remote controls. If this is the case, the flow chart in FIG. 13 will be similar, but the remote control unit will keep track of what remote control has requested which data and which objects, and additionally may stream different video signals and different object metadata to different remote controls.

Figure 14:
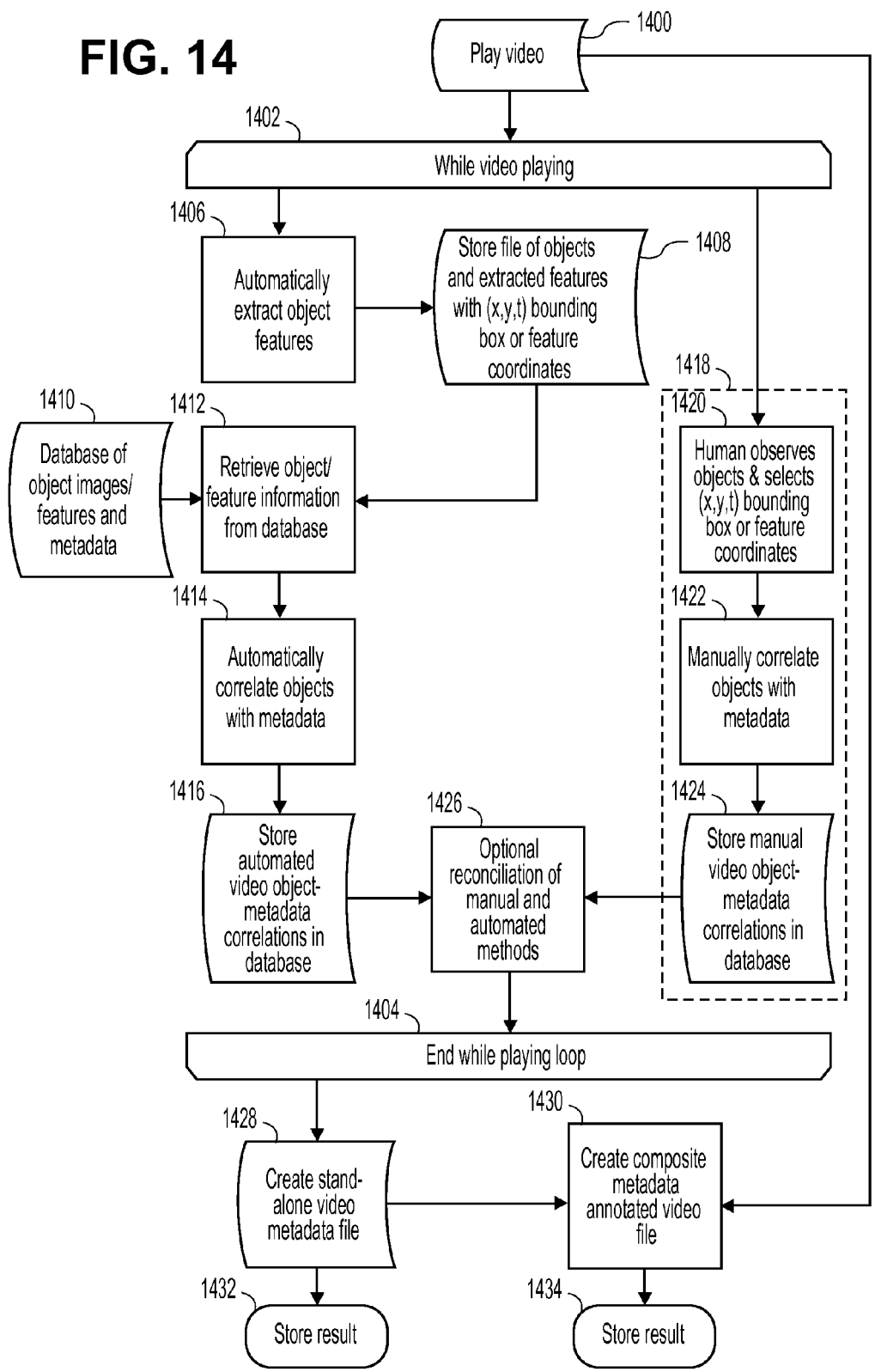
FIG. 14 shows an example of how metadata for a non metadata linked video may be generated using either human based object recognition methods, or completely automated image object recognition methods.

FIG. 14 shows an example of how metadata for an un-metadata linked video may be generated using automated image object recognition methods that can be optionally supplemented (as desired) with human annotation as well.

Here video playback begins 1400, and while the video is playing, the video is metadata linked by a repetitive process proceeding between loop beginning boundary 1402 and loop end boundary 1404. During playback, the video objects are analyzed at routine 1406, which may, for example employ one of a number of computer vision object recognition techniques, such as the previously discussed SUSAN, SIFT, and RANSAC feature analysis methods. As desired, the audio signal may also be analyzed by an automated audio recognition program for words and other audio features of interest, and additionally any other additional information, such as close captioning text, may also be analyzed. As this analysis proceeds, a large database of objects, along with the video coordinates (i.e., the image position and frame number or time sequence of the object) is constructed and stored 1408. Either simultaneously with database 1408 creation or after the database has been created, the system interacts with a typically still larger database 1410 of pre-linked object features and metadata. This can simply be a limited database of objects previously known to be in the video, or alternatively can be a very large database composed of thousands or millions of images and associated metadata collated from multiple outside sources, such large internet websites like Google images, eBay, Amazon, Wikipedia, Facebook, Flickr, and other sites of large image databases. Alternatively or additionally, stock photo databases, and image sources such as Corbis may also be queried. As another example, sources of real-time acquired user generated audio and video information, such as Skype, may also be used. Here routine 1412 matches the features from the video with the features from database 1410, and when the features correspond, links the metadata obtained from database 1410 with the image features seen in video 1400 using routine 1414. This creates a preliminary database of video metadata 1416. Similar methods may also be used to link the audio portion of the video data to various sound databases as well.

As an optional process, a human overseer may also examine the progress or success of the automated video annotation (video metadata creation) process, and make additional observations and changes as desired 1418. Here the process is similar to steps 1406 to 1416, with the exception that a human observer, assisted by computer help, reviews the video and may make different or additional observations of the objects. For example, while an automated vision system may recognize human actors, and even make good guesses as to the actor's sex or age, a human observer may be able to identify specific actors, and enter this observation into the system to supplement the automated data. This is done in steps 1420 and 1422. As before, the results of this human analysis are stored in a database 1424. At step 1426, the automated and human video metadata is reconciled, with the human data using being used to supplement the automated database, and any differences between the human and automated interpretation subjected to either additional review, or often resolved by further human input.

At the end of the process, the video metadata file can either be produced as a stand-alone file with links to various frames and features in the original video file 1428, or alternatively merged with the video file to create a composite file 1430. The process will then terminate 1432, 1434 at this point, and the results will be stored as desired.

It should be further understood that the methods of this invention may be embodied in a wide variety of different hardware and software configurations. For example, the action of video analysis (i.e., determining video features) and meshing these video features with metadata may be accomplished on any one of the various devices (i.e., remote control, media router, primary display, remote servers) described here. Alternatively, the video analysis and metadata linking can be divided among more than one of these devices.

In another aspect, the invention can also be viewed as an improved system to control the display of video media (moving images and sound), and to retrieve video metadata (such as the more information about objects of interest in the video media, and links to sources where more information can be found). The system consists of a hand-held remote control device (video metadata remote control) that is designed to retrieve and manipulate video metadata. The video metadata remote control device will often interact with a local video and metadata server (media server), such as a set-top box, and another main video screen, such as a video (television) monitor designed for communal viewing. The hand held-remote control device will have its own built-in display screen, which when not retrieving metadata will usually show images that are synchronized with the main video screen. However when additional metadata is available, the remote control device will signal the user, and the user will have the option of privately viewing or interacting with the metadata while the video program continues to play on the main video screen.

In some embodiments, the media router will have access to both a first set of video information and a second set of video metadata information, and this video metadata information will have been generated in advance of viewing. In other embodiments, however the video data will be analyzed for features while the video is playing, and these features may be used to dynamically create video metadata pertaining to various objects while the video is playing.

As previously discussed, the display screen of the hand-held video metadata remote control will usually be synchronized with the main television or video display screen. As the video program is played, however, information pertaining to the availability of metadata for the various objects shown on the main video display screen will be shown on the remote control's display. Here the remote control display screen can continue to show video that is synchronized with the main video display, but the remote control display screen can be annotated or overlaid with visual alerts showing that additional metadata is available. For example, video scene objects that have available metadata may be overlaid or marked with arrows or cursors, altered colors, outlined, surrounded by visual bounding boxes, be shown as small icons in a picture-in-a picture, and so on. These metadata alert signals will alert the user to the presence of metadata, and also quickly allow the user to immediately see if the metadata pertains to an object in the video scene of viewer interest.

Using the video metadata remote control, a user engaged in communal video viewing off of a main video display may use the video metadata remote control to select and click on a video object of interest, and request further information about the object. In one embodiment, this will work because a set-top box has relayed the video signal and available metadata information to the remote control and the remote control in turn has requested further metadata information from the media router. The media router may supply the requested object metadata from its own internal video metadata memory, or alternatively pass this query on to a remote server, such as an internet video metadata database. This requested data will then often be passed back to the set-top box and on to the user's metadata remote control. Thus the user can find out further information about objects (or persons) of interest in the video, without disturbing the other viewers. Indeed, if the requested metadata contains links to other URL's (universal resource locators) such as internet stores, a user might even use the remote control to quietly purchase the item of interest while the other viewers continue to watch the main program.

The user may decide to push the information displayed on the remote control to the main Display in order to share it with the other viewer.

In other embodiments, a viewer interested in only one aspect of a video program might request that a custom edited version of the program, that only contains the object of interest, be privately shown on the video metadata remote control. For example, a young boy who is watching a romantic movie with his family that contains car chase scenes might select a car object, and request that the set-top box privately send his metadata remote control scenes containing only cars and car chases. On the other hand, the boy's older sister, watching the same communal video with her own metadata remote control, might also select the car object, and request that the set-top box privately send her metadata remote control scenes with all the car chases deleted.

If a group consensus as to what is most interesting is determined, the metadata remote control user might then use their metadata remote control to signal that the edited version of the movie then be shown on the main TV. Thus in our young boy and his older sister example, depending upon who wins the battle for control of the main video monitor, the entire group may end up watching a car chase version of the video, or a romance version of the video.

In addition to the various advertising applications previously discussed, the invention may also be used by advertisers to insert advertisements into video content, including old video content that has not previously been linked to metadata. Thus an advertiser may decide to purchase rights to an old period movie, run the movie through various feature recognition methods, and provide appropriate links to current metadata. Thus a viewer watching an old 1940's movie, and who is interested in a car in the scene, may click on the car, and instantly be linked to a seller of vintage automobiles that will sell the car that Humphrey Bogart, or other period actor, may be driving. Such methods will work well with present day video content, as well.

The methods of the present invention may also be used to translate between different metadata formats. For example, a video-metadata link may be translated back and forth between different formats such as MPEG-7 and Flash, as desired by the user.

A user may also use the remote control of the present invention to hand-annotate video sources. As an example, a user may view a video, and be interested in an object in a video that either does not already have metadata linked to it, or else has inadequate metadata linked to it. Using the methods of the present invention, a user may point-to an object on the remote control (such as by drawing a bounding box around it using the remote's touch sensitive screen, or by other methods), and then manually annotate the point-to object by typing in a label (such as a name or a brief descriptive sentence), writing in the label, speaking the label, pushing a button, or other means. The remote control can then recognize the object-label association, and either store this in an annotation database, attempt to provide metadata linked to the user supplied label, or both.

The invention may also be used by a group to provide metadata to video. For example, in sports, a group of coaches could meet to analyze video footage of a game on one or more primary video devices, and use their individual remote controls to collectively annotate various portions of the objects and players in the game. Essentially any complex scene where multiple viewers each have different and useful perspectives will benefit from such collaborative techniques.

Such group annotation need not be confined to local groups. In an alternative embodiment, groups in different locations may collectively analyze video scenes, and utilize peer-to-peer computing technology, and social networking technology, to annotate and analyze video.

Another application of the systems and methods described herein is sharing of information between multiple users, which creates a community experience. For example, a user watching a movie and looking up some objects in the movie may wish to share the information about these objects with other users. This can be accomplished using the primary display (e.g., displaying such information on the display) if the users are in the same room, or sending the information to the remote control devices of the other users if they are distant.

In some implementations, the user actions can be collective, i.e., require multiple users to perform an action. For example, users may vote for a participant in a young talent program such as American Idol by clicking on the preferred singer. The response action can be, for example, selecting the candidate according to majority vote.

Another application is object-based navigation. For example, the user may click an object in the video and fast forward to the next appearance of the object in the video or in other videos. Another implementation displays all the videos in which the same or similar objects appeared. These results may be displayed on the primary display, the remote display, or both.

The invention may also involve a number of functions to be performed by a computer processor, such as a microprocessor. The microprocessor may be a specialized or dedicated microprocessor that is configured to perform particular tasks according to the invention, by executing machine-readable software code that defines the particular tasks embodied by the invention. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of devices, such as laptop or desktop computers, hand held devices with processors or processing logic, and also possibly computer servers or other devices that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the invention as described herein enable the physical transformation of these memory devices. Accordingly, the invention as described herein is directed to novel and useful systems and methods that, in one or more embodiments, are able to transform the memory device into a different state. The invention is not limited to any particular type of memory device, or any commonly used protocol for storing and retrieving information to and from these memory devices, respectively.

Embodiments of the systems and methods described herein facilitate processing of video data. Additionally, some embodiments may be used in conjunction with one or more conventional video processing and/or video display systems and methods. For example, one embodiment may be used as an improvement of existing video processing systems.

Although the components and modules illustrated herein are shown and described in a particular arrangement, the arrangement of components and modules may be altered to perform video processing in a different manner. In other embodiments, one or more additional components or modules may be added to the described systems, and one or more components or modules may be removed from the described systems. Alternate embodiments may combine two or more of the described components or modules into a single component or module.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A system to control interaction with a first source of video data and a second source of associated metadata, the video data containing video images including a plurality of objects, the metadata associated with at least one of the plurality of objects, the system comprising:
    a video device configured to process the first source of video data and generate the video images, the video device further configured to use artificial image recognition methods to automatically identify object features in the video images and use these object features to identify metadata in the second source of metadata that is associated with the identified objects;
    and a portable device configured to communicate with the video device and to display the video images, the portable device further configured to synchronize the display of video images with the video device, the portable device further configured to receive spatio-temporal video image coordinate input from a user that selects an object in the video image, and wherein the portable device communicates the selected object to the video device, receives metadata from said second source that is associated with the selected object, and displays the received metadata to the user.

2. The system of claim 1, wherein the portable device is a remote control device configured to wirelessly communicate with the video device.

3. The system of claim 1, wherein the video device is a media router.

4. The system of claim 1, further comprising a display device coupled to the video device, the display device configured to display the video images to a user of the portable device.

5. The system of claim 1, wherein the portable device includes a touch screen configured to receive user spatio-temporal video image coordinate input; and wherein said portable device is further configured to allow said user to control playback of the video images.

6. The system of claim 1, wherein the video device is further configured to retrieve metadata from a remote metadata source.

7. The method of claim 1, wherein said artificial image recognition methods comprise one or more operations selected from the group consisting of Smallest Univalue Segment Assimilating Nucleus (SUSAN) invariant feature detection, scale-invariant feature transform (SIFT) descriptor detection, and Random Sample Consensus (RANSAC) operations.

8. The method of claim 1, wherein selecting an object in the video image is further done by using the spatio-temporal video image coordinates of the user input, and artificial image recognition methods, to extract an object identifier; or
    by using a subset of the video data around the spatio-temporal coordinates of said user input, and artificial image recognition methods, to compute a client video signature;
    sending said client video signature to a server;

and using a server video signature of said video, also derived by artificial image recognition methods, to select said object.

9. A method of controlling interaction with video data received from a first source, and associated metadata received from a second source, the video data containing video images, the method comprising:
 using artificial image recognition methods to process the video images on a video device to automatically identify a plurality of object features in the video images; synchronizing the video images with a portable device having a video display;
 receiving user spatio-temporal video image coordinate input from the portable device, wherein the user input selects an object in the video image;
 using said object features to identify metadata in said second source of metadata that is associated with the selected object;
 and communicating at least a portion of the identified metadata to the portable device for display on the portable device video display.

10. The method of claim 9, further comprising receiving playback control instructions from the portable device.

11. The method of claim 9, further comprising receiving a request for additional metadata associated with an object from the portable device.

12. The method of claim 9, wherein the metadata includes bounding boxes that mark the spatial coordinates of the objects in the video images.

13. The method of claim 9, wherein identifying metadata associated with the selected object includes retrieving metadata from a metadata source.

14. The method of claim 9, wherein the metadata includes hypertext, or information associated with the name or identity of the selected object, or an advertisement associated with the selected object.

15. The method of claim 9, wherein said artificial image recognition methods comprise one or more operations selected from the group consisting of Smallest Univalue Segment Assimilating Nucleus (SUSAN) invariant feature detection, scale-invariant feature transform (SIFT) descriptor detection, and Random Sample Consensus (RANSAC) operations.

16. The method of claim 9, wherein selecting an object in the video image is further done by using the spatio-temporal video image coordinates of the user input, and artificial image recognition methods, to extract an object identifier; or
 by using a subset of the video data around the spatio-temporal coordinates of said user input, and artificial image recognition methods, to compute a client video signature;
 sending said client video signature to a server;
 and using a server video signature of said video, also derived by artificial image recognition methods, to select said object.

17. The method of claim 11, further comprising retrieving and communicating the additional metadata associated with the object to the portable device for presentation on the portable device video display.

18. The method of claim 12, wherein the bounding boxes are used in identifying a selected object from the received user input.

19. A method comprising:
 receiving identification of a selected object from a portable device;
 using artificial image recognition methods and user spatio-temporal video image coordinate input from said portable device to automatically analyze a first source of video data to identify a plurality of image features;
 wherein said artificial image recognition methods comprise one or more operations selected from the group consisting of Smallest Univalue Segment Assimilating Nucleus (SUSAN) invariant feature detection, scale-invariant feature transform (SIFT) descriptor detection, and Random Sample Consensus (RANSAC) operations;
 communicating the image features to a remote server;
 receiving a list of objects associated with the image features from the remote server;
 receiving a second source of metadata associated with the list of objects from the remote server;
 and communicating the list of objects and the video data to said portable device.

20. The method of claim 19, further comprising identifying metadata associated with the selected object and communicating the identified metadata to the portable device.

* * * * *